(12) United States Patent
Henderson et al.

(10) Patent No.: US 8,797,152 B2
(45) Date of Patent: Aug. 5, 2014

(54) HAPTIC ACTUATOR APPARATUSES AND METHODS THEREOF

(75) Inventors: David Henderson, Farmington, NY (US); Qin Xu, West Henrietta, NY (US)

(73) Assignee: New Scale Technologies, Inc., Victor, NY (US)

( * ) Notice: Subject to any disclaimer, the term of this patent is extended or adjusted under 35 U.S.C. 154(b) by 493 days.

(21) Appl. No.: 13/170,993

(22) Filed: Jun. 28, 2011

(65) Prior Publication Data
US 2013/0002411 A1     Jan. 3, 2013

(51) Int. Cl.
*H01L 41/053*     (2006.01)
*H01L 41/09*      (2006.01)

(52) U.S. Cl.
USPC ............ 340/407.1; 340/7.6; 310/323.12; 310/323.16; 310/326; 310/330; 310/335

(58) Field of Classification Search
USPC .......... 340/407.1, 7.6; 310/323.12, 323.16, 310/326, 330, 355
See application file for complete search history.

(56) References Cited

U.S. PATENT DOCUMENTS

| | | | | |
|---|---|---|---|---|
| 6,563,253 | B2 * | 5/2003 | Diefenbach et al. | 310/328 |
| 7,309,943 | B2 * | 12/2007 | Henderson et al. | 310/323.02 |
| 2009/0200880 | A1 * | 8/2009 | Mortimer et al. | 310/81 |
| 2010/0039715 | A1 | 2/2010 | Xu et al. | |
| 2011/0018390 | A1 | 1/2011 | Guidarelli et al. | |

\* cited by examiner

*Primary Examiner* — Daniel Wu
*Assistant Examiner* — John Bamert
(74) *Attorney, Agent, or Firm* — LeClairRyan, A Professional Corporation

(57) ABSTRACT

A haptic actuator apparatus and a method of making the same include an ultrasonically vibrating motor and its housing. The housing includes a guide structure coupled to the ultrasonically vibrating motor and at least one spring. The guide structure defines at least one path of motion of the ultrasonically vibrating motor. The at least one spring delimits the at least one path and generates human-detectable vibrations in response to an impact with the ultrasonically vibrating motor.

26 Claims, 26 Drawing Sheets

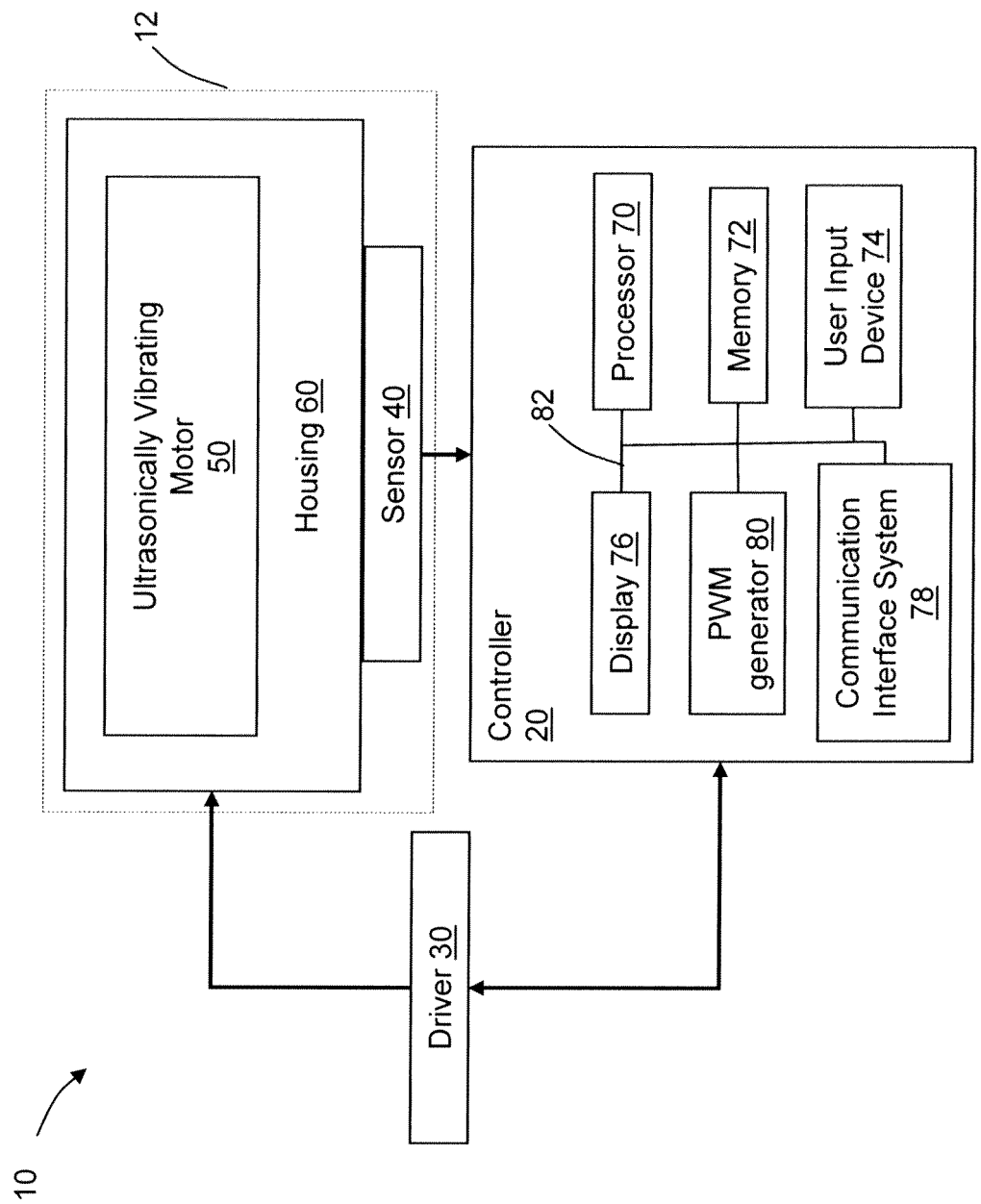

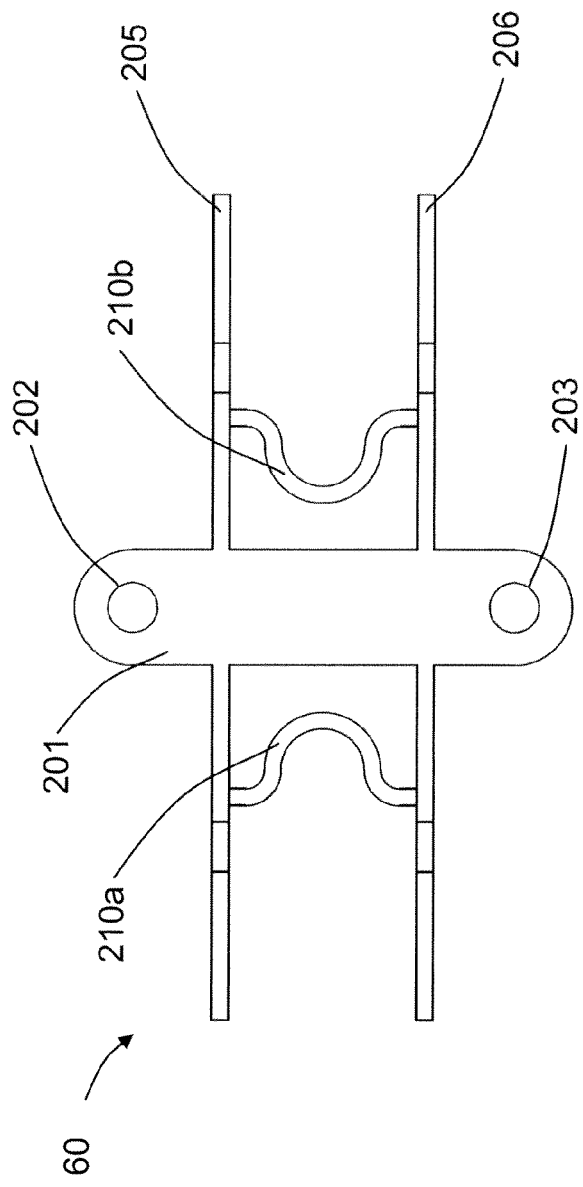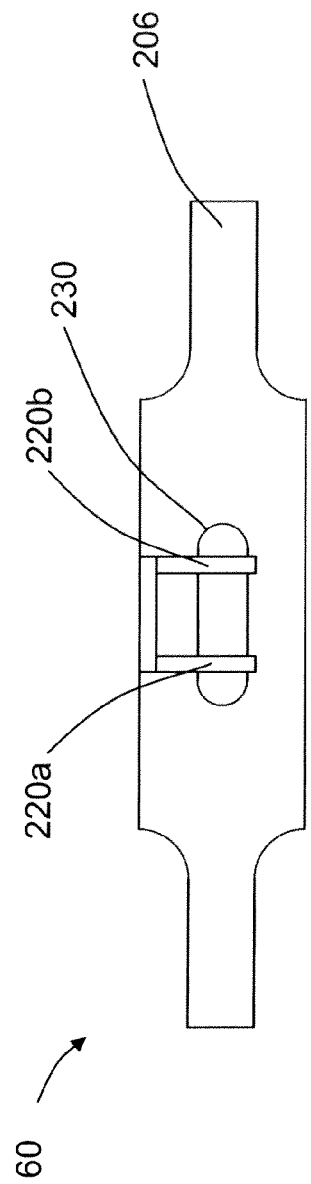
FIG. 3A
FIG. 3B

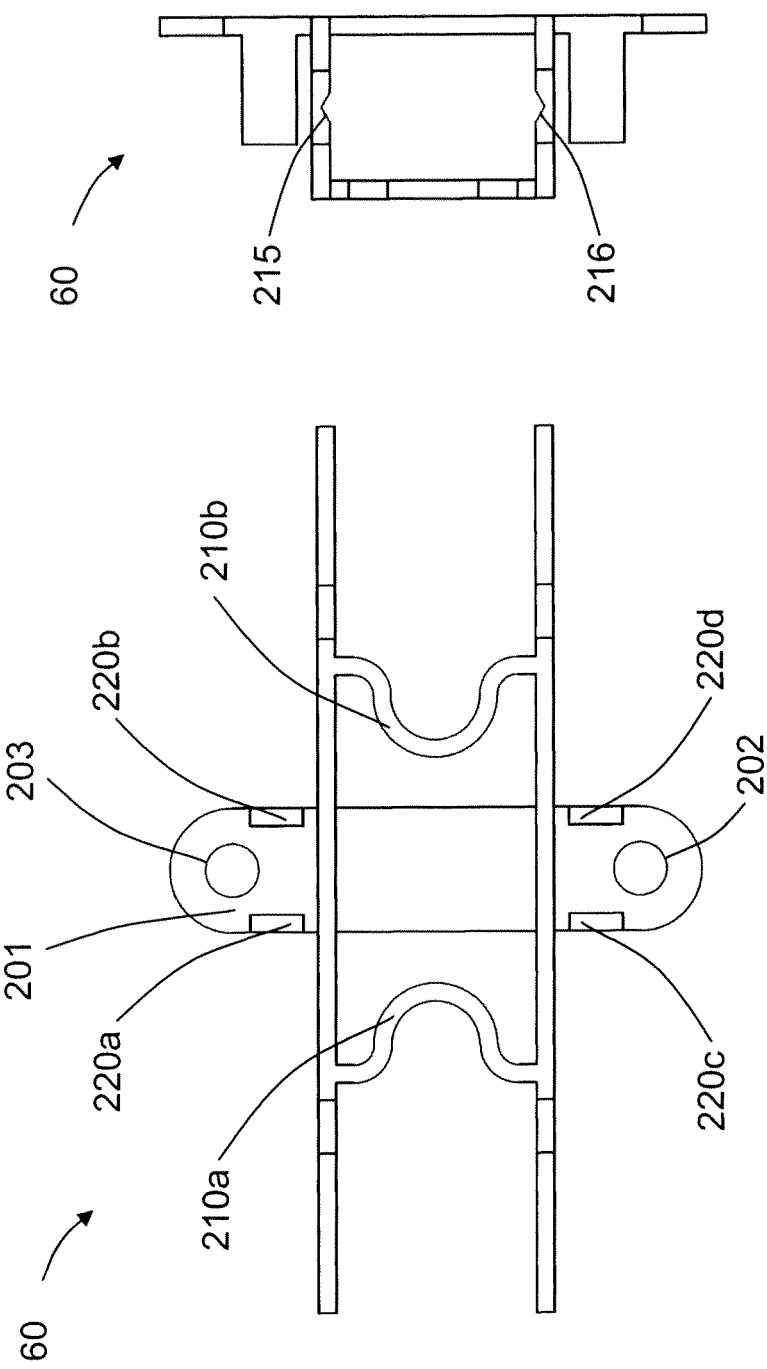

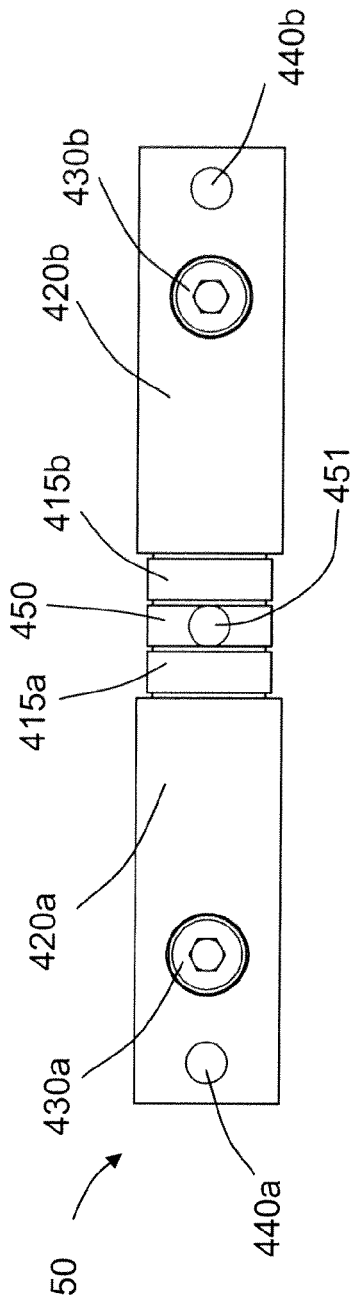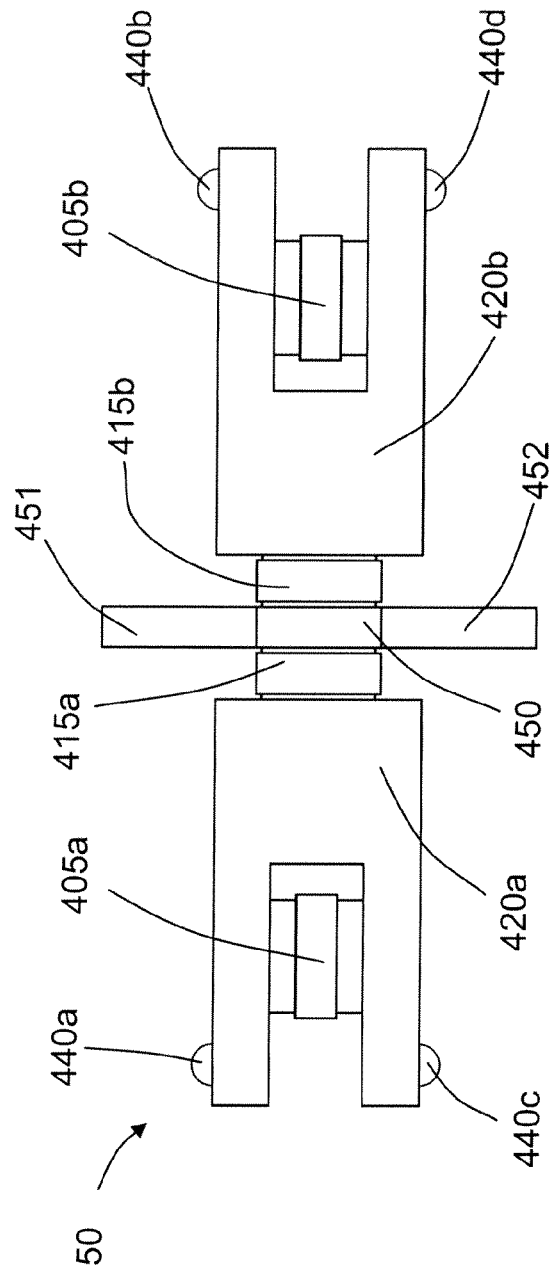
FIG. 4A
FIG. 4B

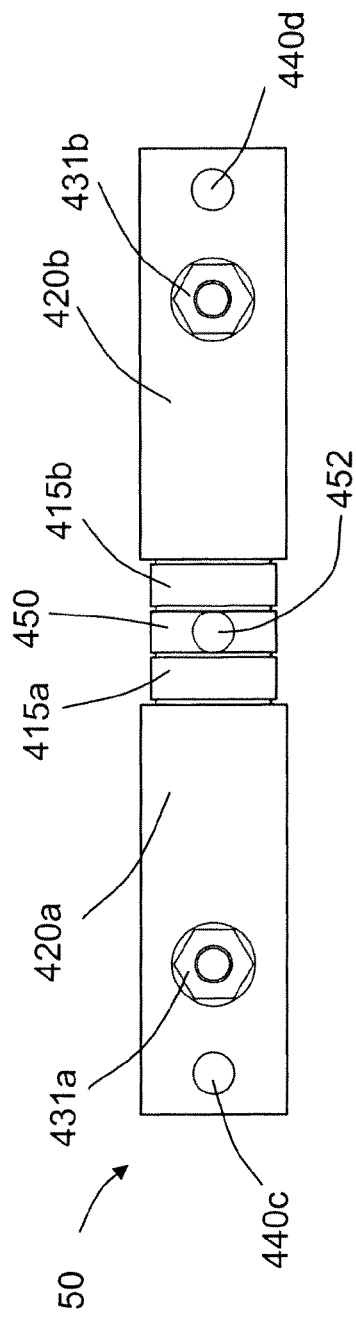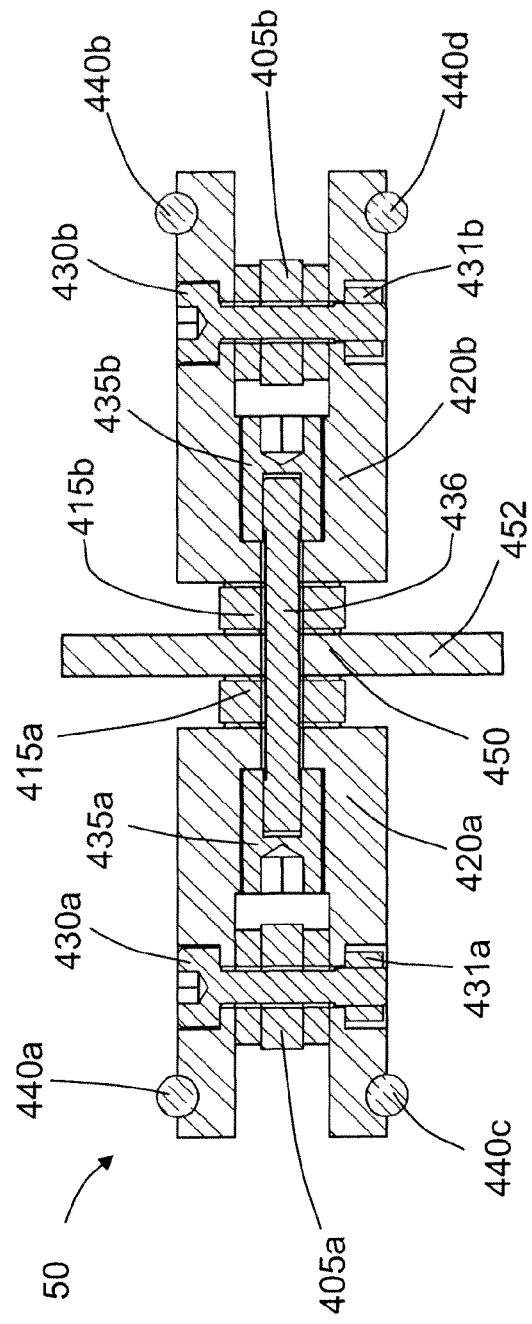
FIG. 4C
FIG. 4D

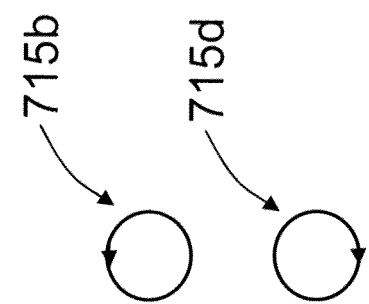
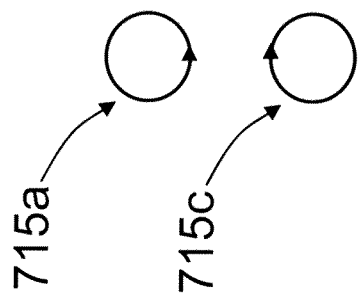
FIG. 7B

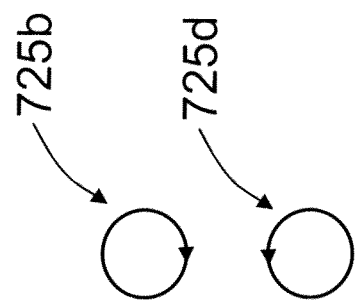
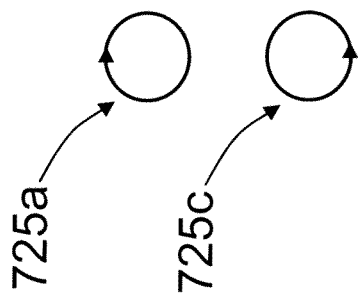
FIG. 7D

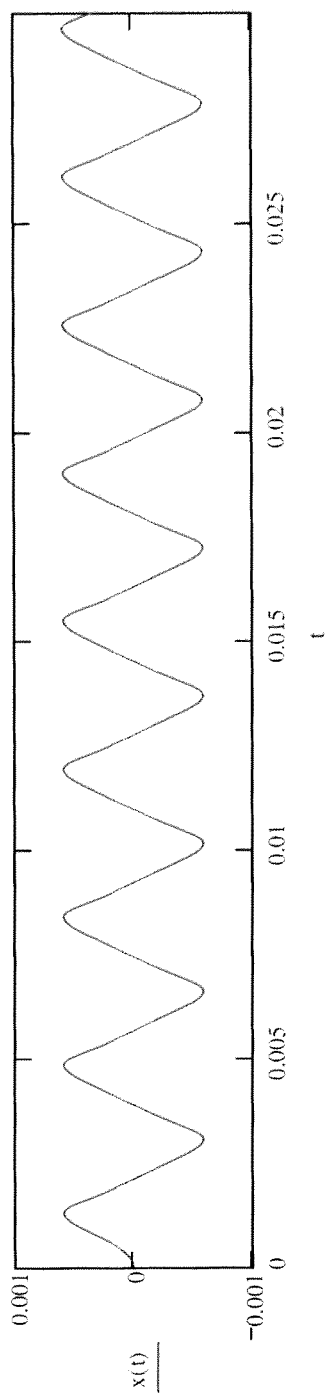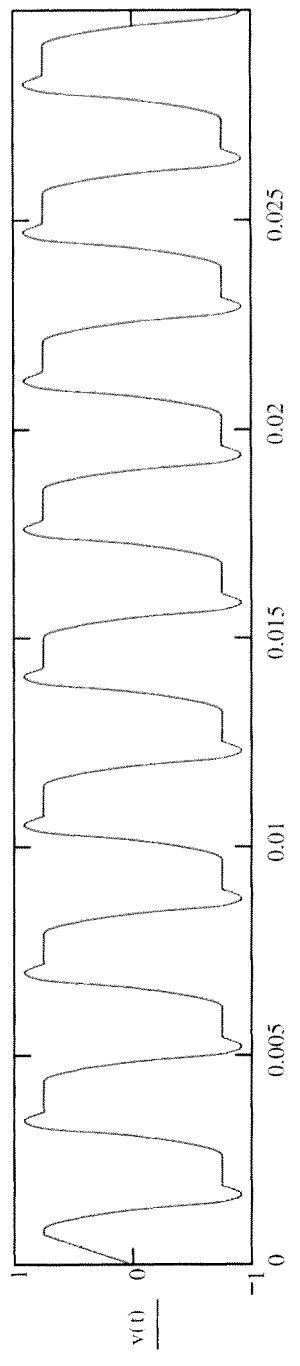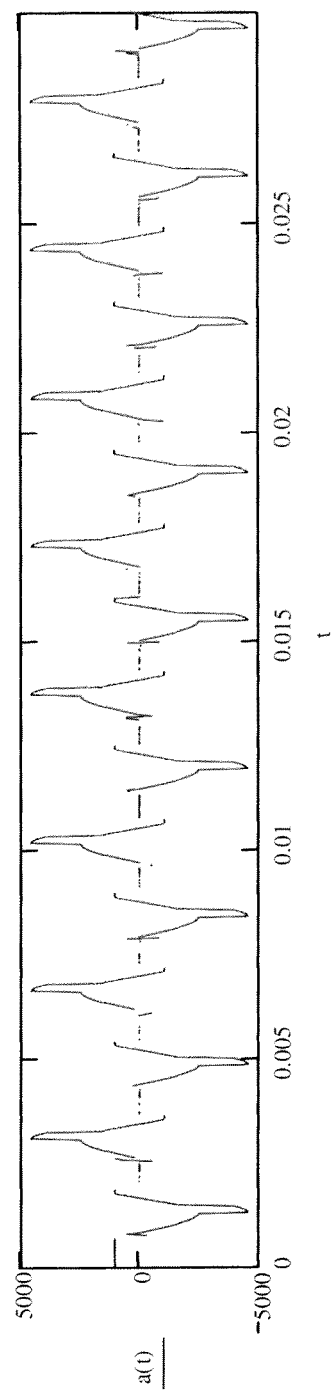

HAPTIC ACTUATOR APPARATUSES AND METHODS THEREOF

FIELD

This technology relates to haptic actuator apparatuses and methods thereof.

BACKGROUND

Mobile phones and other hand-held electronic devices, for example, game controllers require a vibration source that is detectable by the sense of touch of the user. These vibrations signal the user of events without creating significant audible sound. For example, such events might include an incoming phone call, incoming text message, the activation of a button on a flat screen display, turbulence of a virtual aeroplane in a computer video game, and many other functions. The vibration source must be sufficiently strong to be felt by a person holding the device. These sources are most generally referred to as vibration motors or haptic actuators.

One common type of vibration motor is an eccentric rotating mass (ERM) motor with a rotating shaft and an unbalanced mass attached to the shaft that generates oscillating centripetal force perpendicular to the axis of rotation. More than one billion ERM motors are manufactured each year; the typical rotation speed is 100 to 300 Hz, and the typical centripetal force is 0.1 to 1 N.

Exemplary electromagnetic ERM motors include the Model NRS-2574i produced by SANYO SEIMITSU CO., LTD. and the Model DMJBRK30X produced by SAMSUNG ELECTRO-MECHANICS CO., LTD. Some versions are a tubular type ERM motors, and some are disk type ERM motors. For example, some of the smallest tubular ERM motors are about 4 mm in diameter and 6 mm in length, with a shaft and unbalanced Tungsten mass extending about 4 mm from one end of the motor. The smallest disk type ERM motors are 10 mm in diameter and 3 mm thick, with the Tungsten mass rotating inside the motor housing and the rotation axis parallel to the centerline of the 10 mm diameter. For both types of motors, a torque is generated to rotate the shaft using conventional direct current (DC) motor designs that include copper coils, iron cores, permanent magnets, and coil switching using brushes and armature. Tungsten is used for the mass because its density is more than twice the density of steel. For a tubular motor, a typical Tungsten mass is 0.4 grams with a center of gravity offset 1 mm from the centerline of shaft rotation. For this example, when the mass rotates at say 200 Hz (1,256 Rad/sec), the generated centripetal force $F_c$=Mass×(Angular Velocity)$^2$×(Radius of Offset)=0.0004 kg×(1256 Rad/sec)$^2$×0.001 M=0.63 N. This dynamic force is sufficient to accelerate the entire mobile phone handset and create vibrations that are perceived by the user.

Another type of vibration motor is a Linear Resonant Actuator (LRA) in which a Tungsten mass is suspended by spring-guide system that allows movement along a substantially linear path, and the spring force acts to keep the mass in the center of the path. An electromagnetic coil and magnet generate Lorentz forces that move the mass back and forth along the path at a frequency equal to the resonant frequency determined by the mass and stiffness of the spring. By operating at resonance, this actuator generates a large vibration amplitude using a relatively small power input to the electromagnetic coil. An example of an LRA motor is the Model DMJBRN1036AA device from SAMSUNG ELECTRO-MECHANICS CO., LTD.

A limitation of ERM and LRA electromagnetic vibration motors is they produce magnetic fields and are constructed of ferromagnetic and conductive materials. The magnetic interference produced by these motors interferes with the operation of other devices in mobile phones (e.g., a compass). This is especially problematic as mobile phone handsets add additional devices and also continue to become smaller and more integrated. Electromagnetic motors are also made from conductive materials that are not transparent to radio frequencies (RF) and cannot be located near a radio antenna of a wireless communication device.

A further limitation of the electromagnetic ERM and LRA haptic actuators is the need for a large percentage of the motor structure to be stationary (e.g., either the windings or the magnet must be stationary). The stationary mass does not contribute to the acceleration force generated by the haptic actuator and increases the total size of the device.

Ceramic motors, such as piezoelectric ultrasonic motors, do not generate magnetic fields, can be constructed from non-ferromagnetic materials, and can also be made almost entirely from non-conductive materials that are substantially RF transparent. A non-magnetic, RF transparent motor has many advantages for integration in highly miniaturized mobile phones.

SUMMARY

A haptic actuator apparatus includes an ultrasonically vibrating motor and housing. The housing includes a guide structure coupled to the ultrasonically vibrating motor and at least one spring. The guide structure defines at least one path of motion of the ultrasonically vibrating motor. The spring delimits the path and generates human-detectable vibrations in response to an impact with the ultrasonically vibrating motor.

A method for making a haptic actuator apparatus includes providing an ultrasonically vibrating motor and housing the ultrasonically vibrating motor. The housing includes coupling a guide structure to the ultrasonically vibrating motor. The guide structure is configured to define at least one path of motion of the ultrasonically vibrating motor. The housing also includes arranging at least one spring to delimit the at least one path and to generate human-detectable vibrations in response to an impact with the ultrasonically vibrating motor.

This technology offers many advantages including providing a haptic actuator apparatus that generates more haptic force in a smaller volume than prior haptic actuator devices. Additionally, this technology provides haptic actuator devices that do not produce any magnetic interference with the operation of the devices they are incorporated in.

BRIEF DESCRIPTION OF THE DRAWINGS

FIG. 1 is an exemplary haptic actuator apparatus;

FIG. 3A is a back view of a housing of the exemplary haptic actuator of FIG. 2A;

FIG. 3B is a top view of the housing of the exemplary haptic actuator of FIG. 2A;

FIG. 3C is a front view of the housing of the exemplary haptic actuator of FIG. 2A;

FIG. 3D is a side view of the housing of the exemplary haptic actuator of FIG. 2A;

FIG. 4A is a top view of an ultrasonically vibrating motor of an exemplary haptic actuator of FIG. 2A;

FIG. 4B is a front view of the ultrasonically vibrating motor of the exemplary haptic actuator of FIG. 2A;

FIG. 4C is a bottom view of the ultrasonically vibrating motor of the exemplary haptic actuator of FIG. 2A;

FIG. 4D is a cross section view of the ultrasonically vibrating motor of the exemplary haptic actuator of FIG. 2A;

FIG. 7B are diagrams illustrating a trajectory of four frictional contact pads during forward operation of an ultrasonically vibrating motor in response to the drive signals shown in FIGS. 7A and 7E;

FIG. 7D are diagrams illustrating a trajectory of four frictional contact pads during reverse operation of an ultrasonically vibrating motor in response to the drive signals shown in FIGS. 7C and 7F;

FIG. 9A is a graph of haptic displacement as a function of time for an exemplary ultrasonically vibrating motor with an intended haptic velocity profile as shown in FIG. 8A and a command signal as shown in FIG. 8B;

FIG. 9B is a graph of haptic velocity as a function of time for the ultrasonically vibrating motor associated with FIG. 9A;

FIG. 9C is a graph of haptic acceleration as a function of time for the ultrasonically vibrating motor associated with FIG. 9A;

DETAILED DESCRIPTION

Figure 2A:
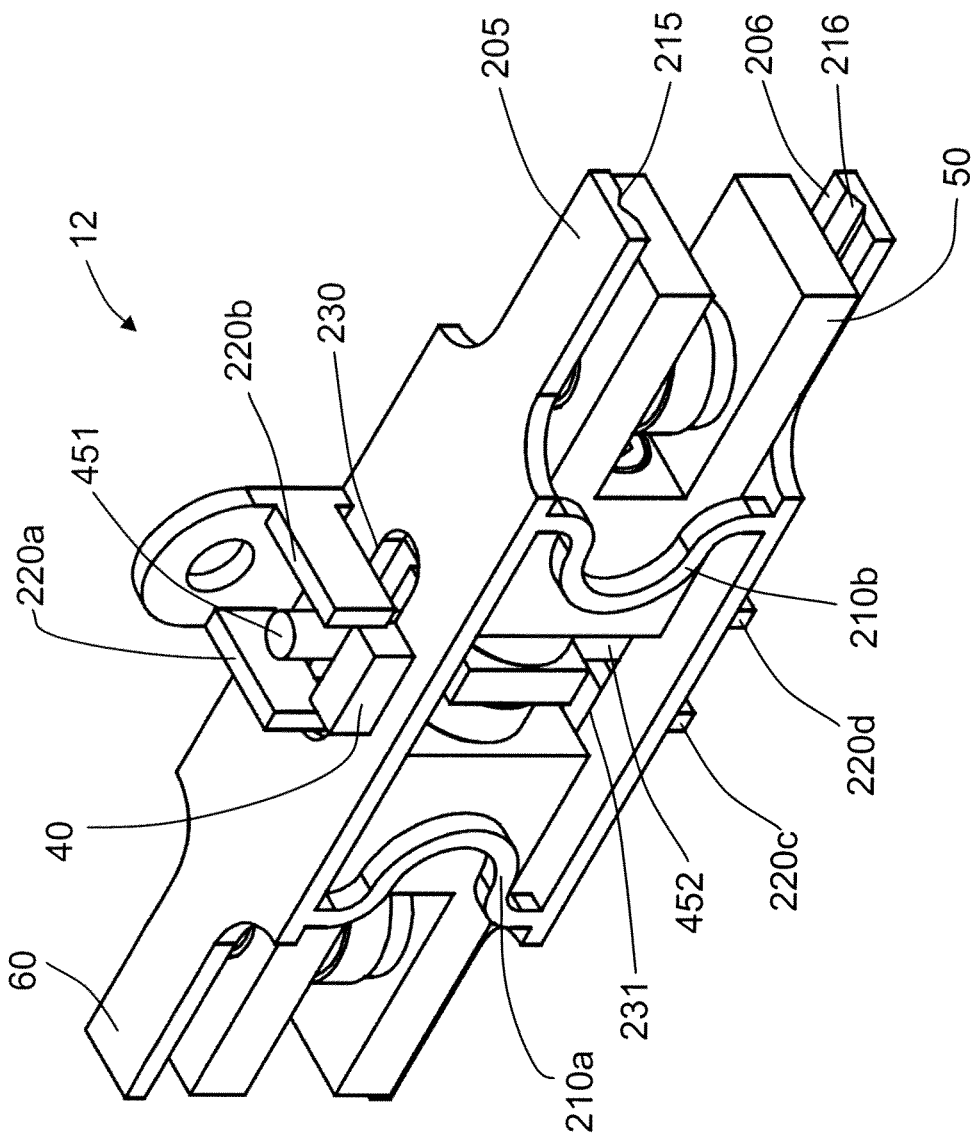
FIG. 2A is an isometric view of the exemplary haptic actuator.

An exemplary haptic actuator apparatus 10 is illustrated in FIG. 1. The exemplary haptic actuator apparatus 10 includes a controller 20, a driver 30, a sensor 40, an ultrasonically vibrating motor 50, and a housing 60, although the apparatus could comprise other numbers and types of systems, devices, and components in other configurations. This technology offers a number of advantages including providing a haptic actuator apparatus that generates more haptic force in a smaller volume than prior haptic actuator devices.

Referring more specifically to FIG. 1, the controller 20 includes a processor 70, a memory 72, a user input device 74, a display 76, a communication interface system 78, and a pulse width modulation (PWM) generator 80, which are coupled together by a bus or other link 82, although other numbers and types of systems, devices, and components in other configurations may be used, and the PWM generator system 80 may be separate from the controller 20.

The processor 70 may execute a program of stored instructions for one or more aspects of the present disclosure as described herein, including controlling velocity and direction of the ultrasonically vibrating motor 50

The memory 72 may store these programmed instructions for one or more aspects of the present disclosure as described herein, although some or all of the programmed instructions may be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 70 can be used for the memory 72.

The user input device 74 may be used to input selections, such as to input a drive mode selection, a selection of a percentage of pulse width, a selection of a percentage of drive voltage, or a desired output frequency of the ultrasonically vibrating motor 50, although the user input device 74 may be used to input other types of data and actions and interact with other elements. The user input device 74 may include a computer keyboard and a computer mouse, although other types and numbers of user input devices can be used.

The display 76 may be used to show a graphical user interface for inputting requests and viewing a resulting response, although other types and amounts of information can be displayed in other manners. The display 76 may include a computer or mobile communications device display screen, such as a CRT or LCD screen, although other types and numbers of displays could be used. For example, in a miniaturized haptic actuator apparatus, the display 76 may be separate and used remotely.

The communication interface system 78 may be used to operatively couple and communicate between the controller 20 and the driver 30 along with the ultrasonically vibrating motor 50 via one or more communications networks, although other types and numbers of connections, configurations, and communication manners can be used.

The PWM generator 80 may generate one or more driving signals which are provided to driver 30 in response to instructions from the controller 20. The PWM generator 80 may generate the one or more driving signals as described by way of example only in U.S. Patent Application Pub. No. 2011/0018390, entitled "Methods for Controlling Velocity of at Least Partially Resonant Actuators Systems and Systems Thereof," which is hereby incorporated by reference in its entirety, and will not be described in detail herein.

Although an embodiment of the controller 20 coupled to the ultrasonically vibrating motor 50 and housing 60 is described and illustrated herein, the controller may be implemented on any suitable computer system or device or an application specific integrated circuit or other programmable entity. It is to be understood that the controller of the embodiments described herein is for exemplary purposes, as many variations of the specific hardware and software used to implement the embodiments are possible, as will be appreciated by those skilled in the relevant art(s).

The driver 30 may comprise a half-bridge circuit or a full-bridge circuit, although other types of drivers could be used, such as a hybrid driver. By way of example only, a more detailed description of these types of drivers and related methods may be found in U.S. Patent Application Pub. No. 2010/0039715, entitled "Reduced-Voltage, Linear Motor Systems and Methods Thereof," which is hereby incorporated by reference in its entirety, and thus will not be described in detail herein. The driver 30 may have an input coupled to the PWM generator 80 to receive the one or more driving signals and an output coupled to piezoelectric members of the ultrasonically vibrating motor 50 to provide the one or more driving signals. The one or more driving signals may, for example, cause the ultrasonically vibrating motor 50 to move at an output frequency designated via the user input device 74 along a path defined by a guide structure within the housing 60.

Figure 2C:
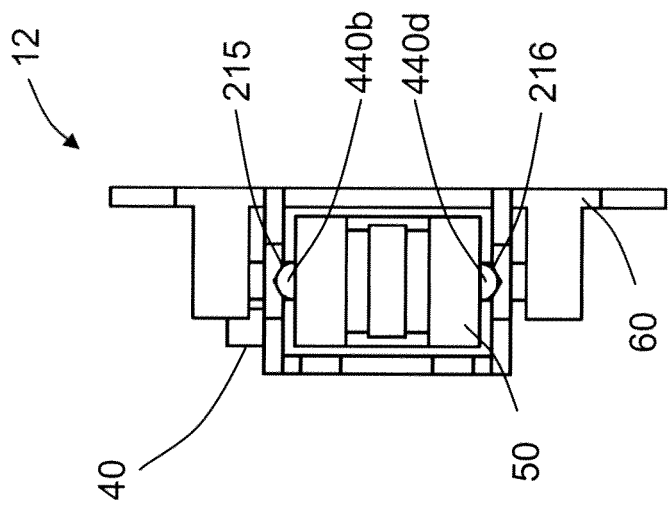
FIG. 2C is a side view of the exemplary haptic actuator.
Figure 2B:
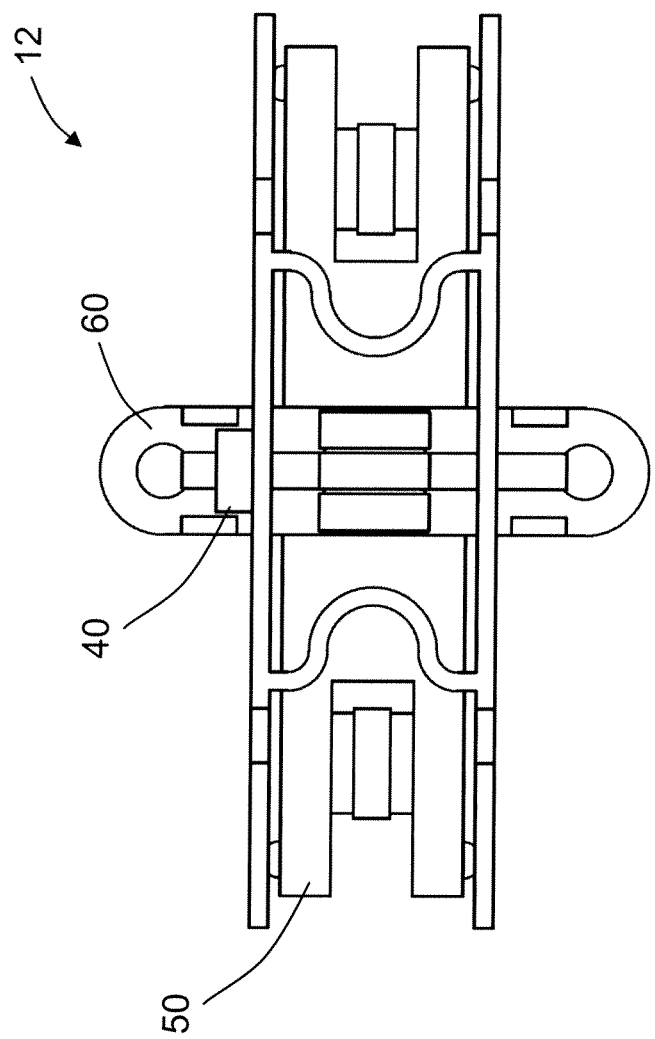
FIG. 2B is a front view of an exemplary haptic actuator.

Referring to FIGS. 1 and 2A, the sensor 40 is used by the controller 20 to monitor the motion of the ultrasonically vibrating motor 50. For example, the sensor 40 may indicate to the controller 20 when the ultrasonically vibrating motor 50 has reached an end of the path. Consequently, processor 20 may command driver 30 to reverse direction. Controller 20 may further adjust the timing of the reversal to achieve a desired output frequency. Haptic actuator 12 integrates motor 50, housing 60 and sensor 40. For simplicity, haptic actuator 12 is shown in FIGS. 2A-2C without driver 30 or controller 20. However, it is also possible to integrate driver 30 and controller 20 within haptic actuator 12 with a very small volume increase using integrated microelectronic circuits. Referring to FIGS. 1, 2A-2C, and 3A-3D, the sensor 40 may be mounted on the housing 60. Sensor 40 may be a position encoder to detect the position of the ultrasonically vibrating motor 50. Alternatively, sensor 40 may be an accelerometer to detect the acceleration of the housing 60 or a base device (which may be mounted on back mount plate 201 of housing 60) that needs the haptic/vibration output.

Referring to FIGS. 1 and 4A-4F, an example of the ultrasonically vibrating motor (or moving mass) 50 of an exemplary haptic actuator apparatus 10 is shown and described. More specifically, referring to FIG. 4B where a front view of the ultrasonically vibrating motor 50 is illustrated, the motor 50 may comprise several major components. Center piece 450 and two frames 420a and 420b may be connected by two axial actuators 415a and 415b, respectively. The two frames and the center piece may be made of strong materials, such as steel.

Referring to FIG. 4B, the two frames 420a and 420b may have fork-like openings at the ends, and two clamping actuators 405a and 405b may connect the two branches of the fork-like openings, respectively. In some embodiments, these axial and clamping actuators are piezoelectric type and thus generate strain when voltages are applied to them. These piezoelectric actuators of the ultrasonically vibrating motor 50 may be made of multi-layer actuators in order to lower the operating voltage. In some of these embodiments, these actuators are ring-shaped and are compression-preloaded to elongate the actuator life as well as to increase performance. Shown in more detail in FIG. 4D is a cross section view of the ultrasonically vibrating motor 50. One clamping actuator 405a may be compression-preloaded by the frame 420a using a screw 430a and a nut 431a. The other clamping actuator 405b may be compression-preloaded by the frame 420b by a screw 430b and a nut 431b. The two axial actuators 415a and 415b may be compression-preloaded by the two frames 420a and 420b and the center piece 450 using a stud 436 and two Allen-nuts 435a and 435b.

Referring to FIGS. 4B and 4D, two contact pads 440a and 440c may be inserted at the top and bottom ends of the two branches of frame 420a. Two contact pads 440b and 440d may be inserted at the top and bottom ends of the two branches of frame 420b. As will be illustrated later, these four contact pads 440a-440d may be used for frictional drive purposes and may be optimized for frictional coefficients as well as wear life. They may be made of ceramic, such as sapphire and ruby, or metal. In this embodiment, they are shown as spherical shapes. However, they can be any suitable shape.

Figure 4F:
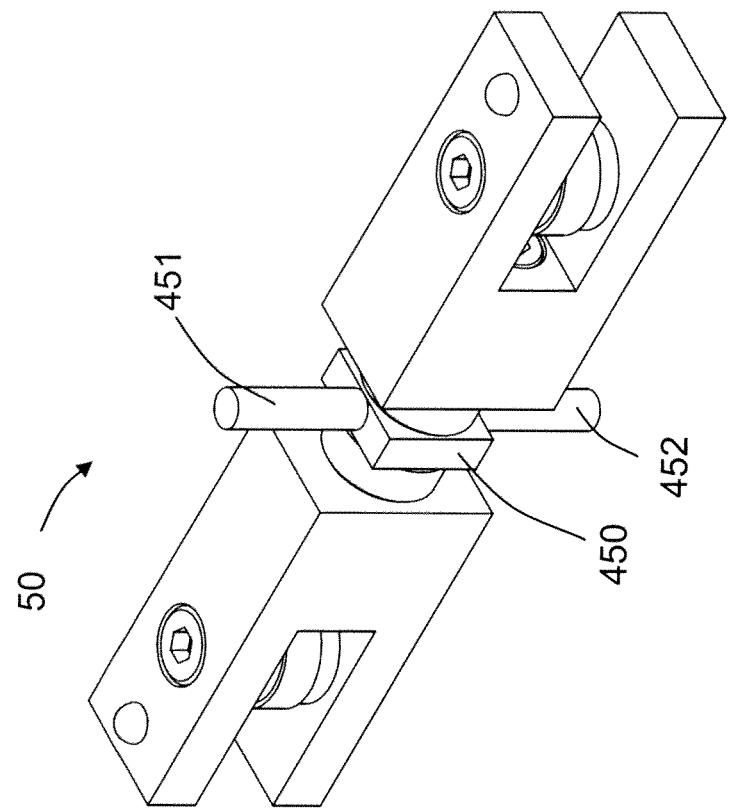
FIG. 4F is an isometric view of the ultrasonically vibrating motor of the exemplary haptic actuator of FIG. 2A.
Figure 4E:
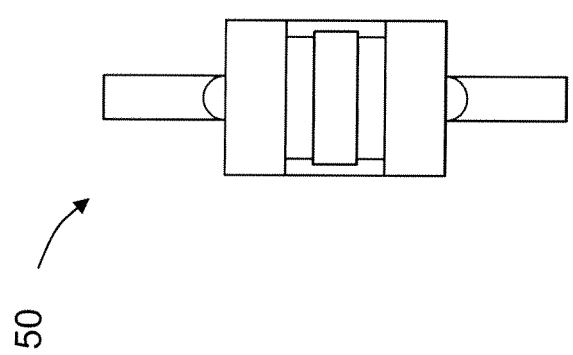
FIG. 4E is a side view of the ultrasonically vibrating motor of the exemplary haptic actuator of FIG. 2A.

As shown in FIG. 4F, the center piece 450 may have two pegs or pins 451 and 452 solidly connected to it on the top and bottom, respectively. In some embodiments, the pegs or pins 451-452 may be cylindrical. In some of these embodiments, the pegs or pins 451-452 may have the same diameter. In other embodiments, the pegs or pins 451-452 may be of any suitable shape or size.

Figure 3E:
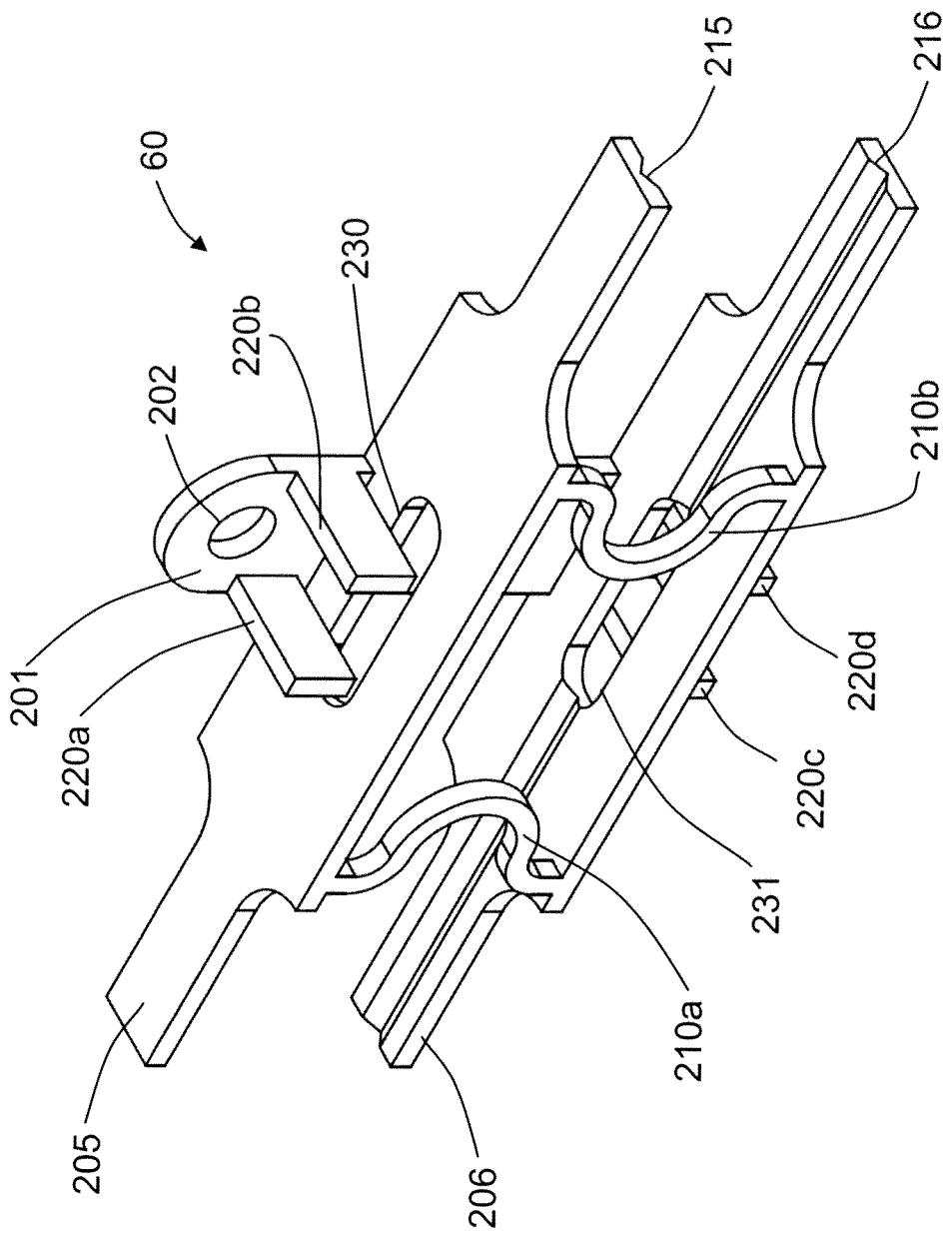
FIG. 3E is an isometric view of the housing of the exemplary haptic actuator of FIG. 2A.

Referring to FIGS. 1-3, an example of the housing 60 in which the ultrasonically vibrating motor 50 runs is illustrated. Referring to FIGS. 3A, 3C, and 3E, the housing 60 may have a back mount plate 201, on which two mounting holes 202 and 203 are shown. These mounting holes 202-203 may be used to fix the housing 60 on a base device, such as a cell phone case, which needs a haptic/vibration output. Referring to FIGS. 2A, 2C, 3A, and 3E, the housing 60 may have two rails, e.g., a top rail 205 and a bottom rail 206, on which the frictional pads 440a-440d may run on. As shown in FIGS. 3D and 3E, the rails 205 and 206 may have grooves 215 and 216, respectively, so that the frictional pads may be linearly guided. Although two mounting holes 202-203 and two rails 205-206 are shown, any suitable number may be utilized.

As shown in FIGS. 2A, 2C, and 3E, the frictional pads 440a-440d may be preloaded in a vertical direction by groove 215 on rail 205 and by groove 216 on rail 206. The preloaded force may be provided by the base device and, in some embodiments, by flexural springs 210a and 210b. Flexural springs 210a and 210b may be used to finely control the preload force. The preload force may greatly affect the motor performance; too little preload force may cause very low drive force, while too much preload force may dampen the motor motion too much and generate no velocity. Although two flexural springs are shown, any suitable number may be utilized.

As shown in FIG. 3E, housing 60 may include holes 230 and 231 on rails 205 and 206, respectively. While holes 230 and 231 are shown to be oblong in shape, each of these holes may be rectangular or any suitable shape. Housing 60 may also include two stopper spring pairs 220a-220b and 220c-220d. Stopper spring pairs 220a-220b and 220c-220d may, for example, be solidly bonded to the back mount plate 201 of the housing 60. Furthermore, as shown in FIG. 2A, pegs 451 and 452 in motor body 50, pointing out through holes 230 and 231, respectively, may be trapped by these two stopper spring pairs 220a-220b and 220c-220d, respectively. When the ultrasonically vibrating motor 50 moves along a linear direction defined by the grooves 215 and 216, the free travel (e.g., without deflecting stopper springs 220a-220d) may be limited by the distance between the stopper springs 220a and 220b minus the diameter of the pegs 451-452. The distance between the stopper springs 220c and 220d may be configured to be the same as the distance between stopper springs 220a and 220b. Although four stopper springs are shown, any suitable number may be utilized. Alternatively or additionally, one or more stopper springs may be coupled to rail 205 or rail 206 or any combination thereof.

Figure 5A:
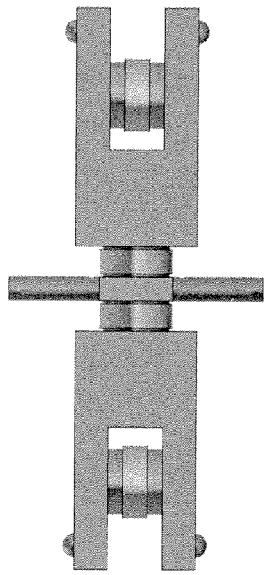
FIG. 5A is a front view of a static ultrasonically vibrating motor body in FIG. 4A.
Figure 5B:
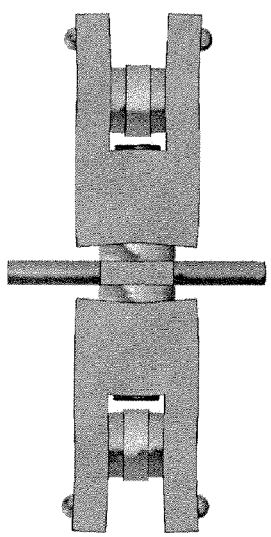
FIG. 5B is a front view of the ultrasonically vibrating motor body shown in FIG. 4A in an axial mode.
Figure 5C:
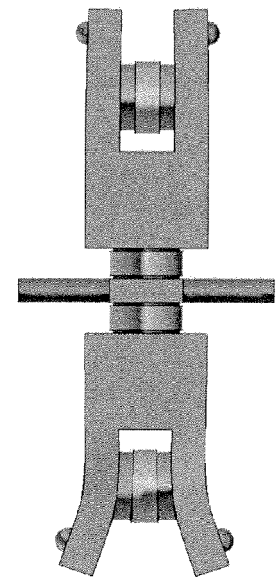
FIG. 5C is a front view of the ultrasonically vibrating motor body shown in FIG. 4A in a first clamping mode.
Figure 5D:
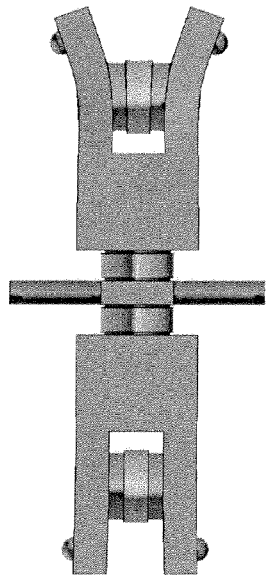
FIG. 5D is a front view of the ultrasonically vibrating motor body shown in FIG. 4A in a second clamping mode.

The operation of the ultrasonically vibrating motor 50 (e.g., by driver 30) may be understood by referring to FIGS. 5A-5D. FIG. 5A is a front view of a static ultrasonically vibrating motor 50. FIG. 5B is the mode shape of the ultrasonically vibrating motor 50 in its axial mode, which may be excited by applying the same voltage signals to axial actuators 415a and 415b. FIG. 5C is the mode shape of the ultrasonically vibrating motor 50 in its first clamping mode, which may be excited by applying a voltage signal to clamping actuator 405a. FIG. 5D is the mode shape of the ultrasonically vibrating motor 50 in its second clamping mode, which may be excited by applying a voltage signal to clamping actuator 405b. The ultrasonically vibrating motor 50 may be designed so that the resonant frequencies for all these three modes are substantially the same and are substantially independent from each other with low coupling.

Figure 6B:
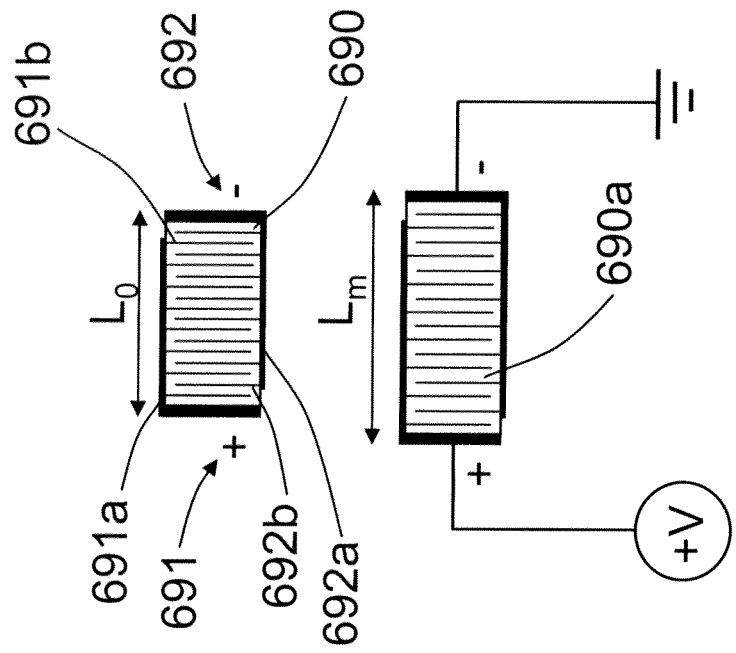
FIG. 6B is a diagram illustrating an elongation of a piezoelectric multilayer actuator when a voltage is applied.
Figure 6A:
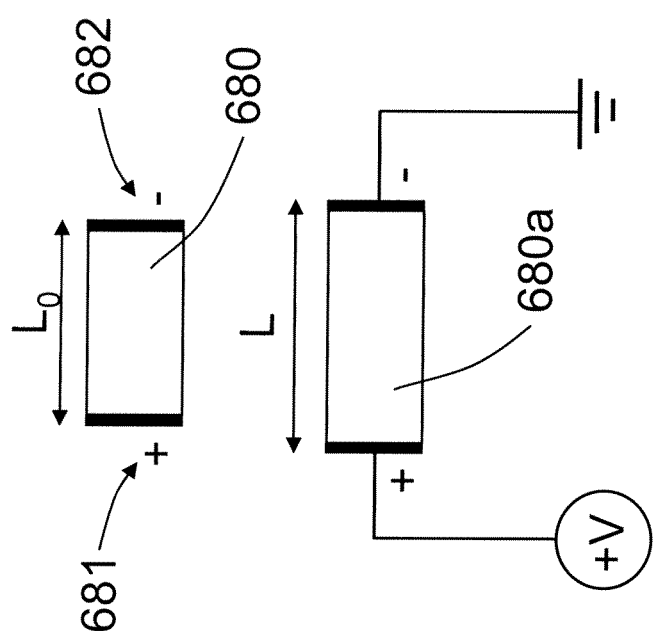
FIG. 6A is a diagram illustrating an elongation of a single-layer piezoelectric actuator when a voltage is applied.

The operation of ultrasonically vibrating motor 50 in exemplary haptic actuator apparatus 10 may be further understood by referring to FIG. 6A, which describes the basic piezoelectric effect. For the axial and clamping actuators, each actuator 680 may have a positive electrode 681 (labeled "+") and a negative electrode 682 (labeled "−"). The actuator length at free state may be $L_0$. Applying a positive electrical signal +V to the "+" electrode of actuator 680 may make the actuator expand in length. The actuator 680a, with the voltage applied, may have a length $L>L_0$. The change in length $(L-L_0)$ may be roughly proportional to the applied voltage V. Similarly, actuator 680 may shrink in length if a negative voltage is applied at the "+" electrode 681.

In some embodiments, these piezoelectric axial and clamping actuators may be further made so that they have multiple internal electrodes as shown in FIG. 6B. Actuator 690 may have several positive internal electrodes 691b, which may be connected to a common side external electrode 691a. Common side external electrode 691a may then connect to the "+" external electrode 691. Actuator 690 may have several negative internal electrodes 692b, which may be connected to a common side external electrode 692a. Common side external electrode 692a may then connect to the "−" external electrode 692. The actuator length at free state is $L_0$. Applying positive electrical signal +V to the "+" electrode of actuator 690 may make the actuator expand in length. The actuator 690a, with the voltage applied, may have a length $L_m>L_0$. The change in length $(L_m-L_0)$ may be roughly proportional to the applied voltage V and the number of layers. Similarly, actuator 690 may shrink in length if a negative voltage is applied at the "+" external electrode 691. Thus, the multilayer piezoelectric actuators can produce more strain at the same applied voltage, compared with a regular (single layer) piezoelectric actuator.

For convenience of explanation, in the following embodiments, axial and clamping actuators are illustrated as single-layer. However, it is understood that the axial and clamping actuators here may be either single layer or multilayer. Further explanation of how piezoelectric ceramic material may be used to generate ultrasonic vibrations is described in detail in the above-referenced U.S. Patent Application Pub. No. 2010/0039715, and will not be described in detail herein, other than to note that such ultrasonic vibrations may include all types of motion including, but not limited to, human-detectable vibrations or impulses.

Figure 7A:
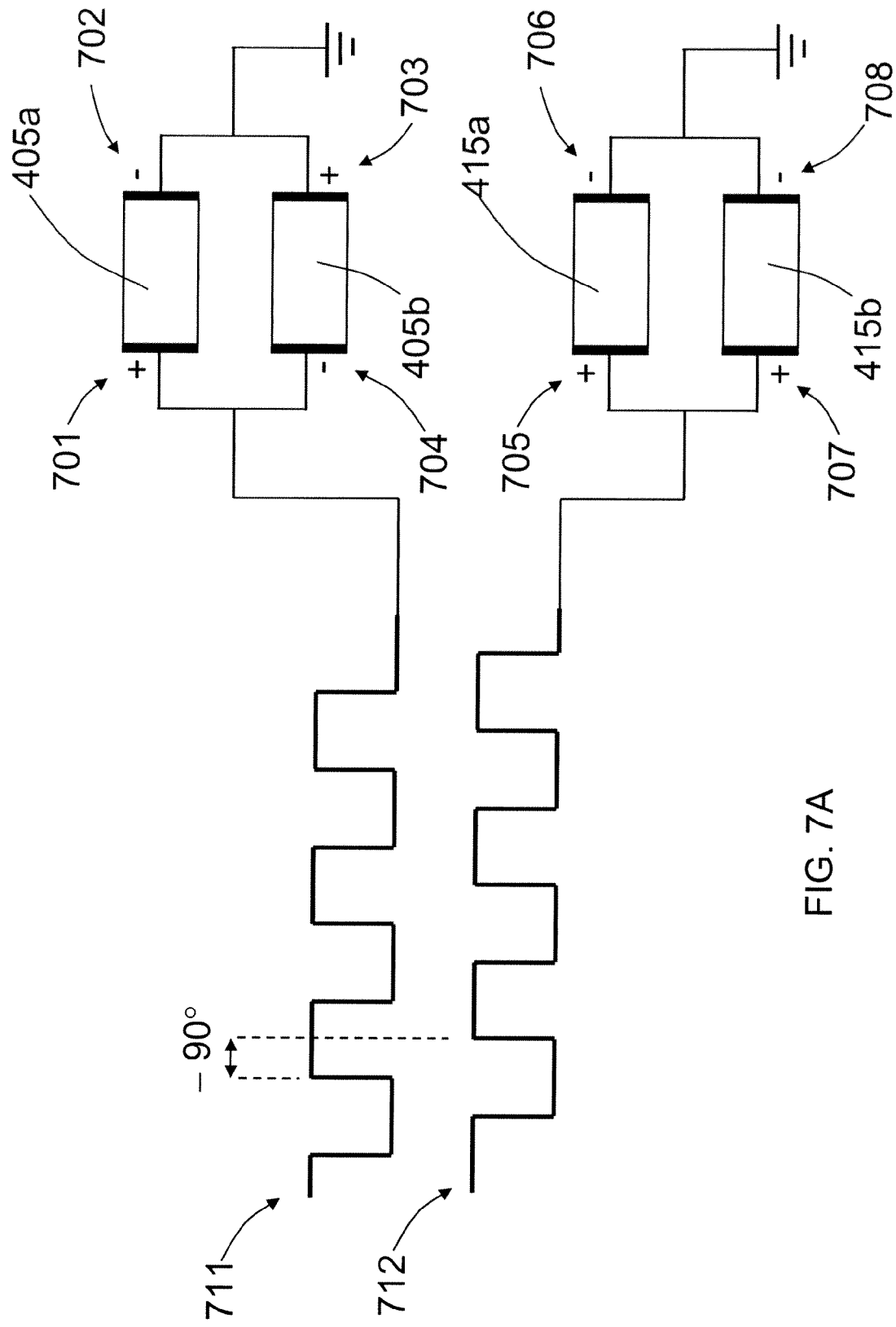
FIG. 7A is a partial graph and partial block diagram which illustrates exemplary electrical drive signals (half-bridge drive) for forward operation of an ultrasonically vibrating motor.

The operation of ultrasonically vibrating motor 50 in exemplary haptic actuator apparatus 10 may be further understood by referring to FIGS. 7A-7D. As shown in FIG. 7A, a periodic electrical signal 711 may be applied to clamping actuator 405a at the positive electrode 701 with a frequency that may be substantially equal to the resonant frequencies of the axial and clamping vibration modes. The periodic electrical signal 711 may also be applied to clamping actuator 405b in a reversed way, e.g., at negative electrode 704. Although electrical signal 711 is depicted as a periodic square-wave signal, any suitable periodic signal may be utilized, e.g., a sinusoidal signal. A similar periodic electrical signal 712 may be applied to axial actuators 415a and 415b at the positive electrodes 705 and 707, but with a −90° phase shift relative to signal 711. The negative electrode 702 of clamping actuator 405a, the positive electrode 703 of clamping actuator 405b, and the negative electrodes 706 and 708 of the axial actuators 415a and 415b may be connected to ground. Referring to FIG. 7B, corresponding trajectories for frictional pads 440a-440d are shown as 715a-715d, respectively. The trajectories are shown as circular shape, but, in some embodiments, elliptical shapes may be more common. In some embodiments, arrows shown for 715a-715d may indicate not only the directions of the trajectories, but also a snapshot of instantaneous positions of the frictional pads 440a-440d relative to each other. Based on the direction of these trajectories, the ultrasonically vibrating motor 50 may move to the right (relative to the housing 60), or to the motor forward operation direction.

Figure 7C:
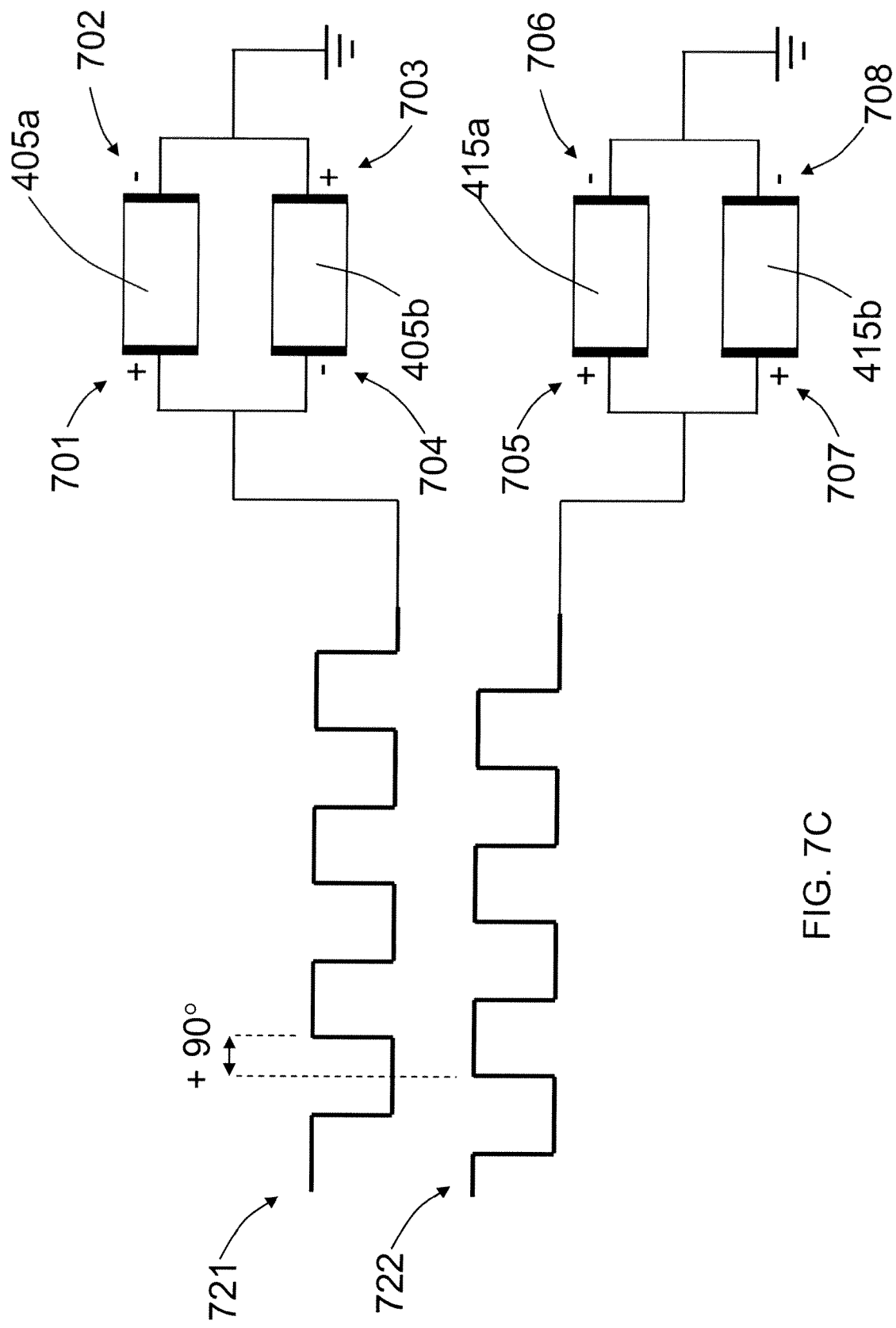
FIG. 7C is a partial graph and partial block diagram which illustrates exemplary electrical drive signals (half-bridge drive) for reverse operation of an ultrasonically vibrating motor.

In FIG. 7C, a periodic electrical signal 721 may be applied to clamping actuator 405a at the positive electrode 701 with a frequency that may be substantially equal to the resonant frequencies of the axial and clamping vibration modes. The periodic electrical signal 721 may also be applied to clamping actuator 405b in a reversed way, e.g., at negative electrode 704. Although electrical signal 721 is depicted as a periodic square-wave signal, any suitable periodic signal may be utilized, e.g., a sinusoidal signal. A similar periodic electrical signal 722 may be applied to axial actuators 415a and 415b at the positive electrodes 705 and 707, but with a +90° phase shift relative to signal 721. The negative electrode 702 of clamping actuator 405a, the positive electrode 703 of clamping actuator 405b, and the negative electrodes 706 and 708 of the axial actuators 415a and 415b may be connected to ground. Referring to FIG. 7D, corresponding trajectories for the frictional pads 440a-440d are shown as 725a-725d, respectively. The trajectories are shown as circular shape, but, in some embodiments, elliptical shapes may be more common. In some embodiments, arrows shown for 725a-725d may indicate not only the directions of the trajectories, but also a snapshot or an instantaneous position of the frictional pads 440a-440d relative to each other. Based on the direction of these trajectories, the motor body 50 may move to the left (relative to the housing 60), or to the motor reverse operation direction.

Figure 7E:
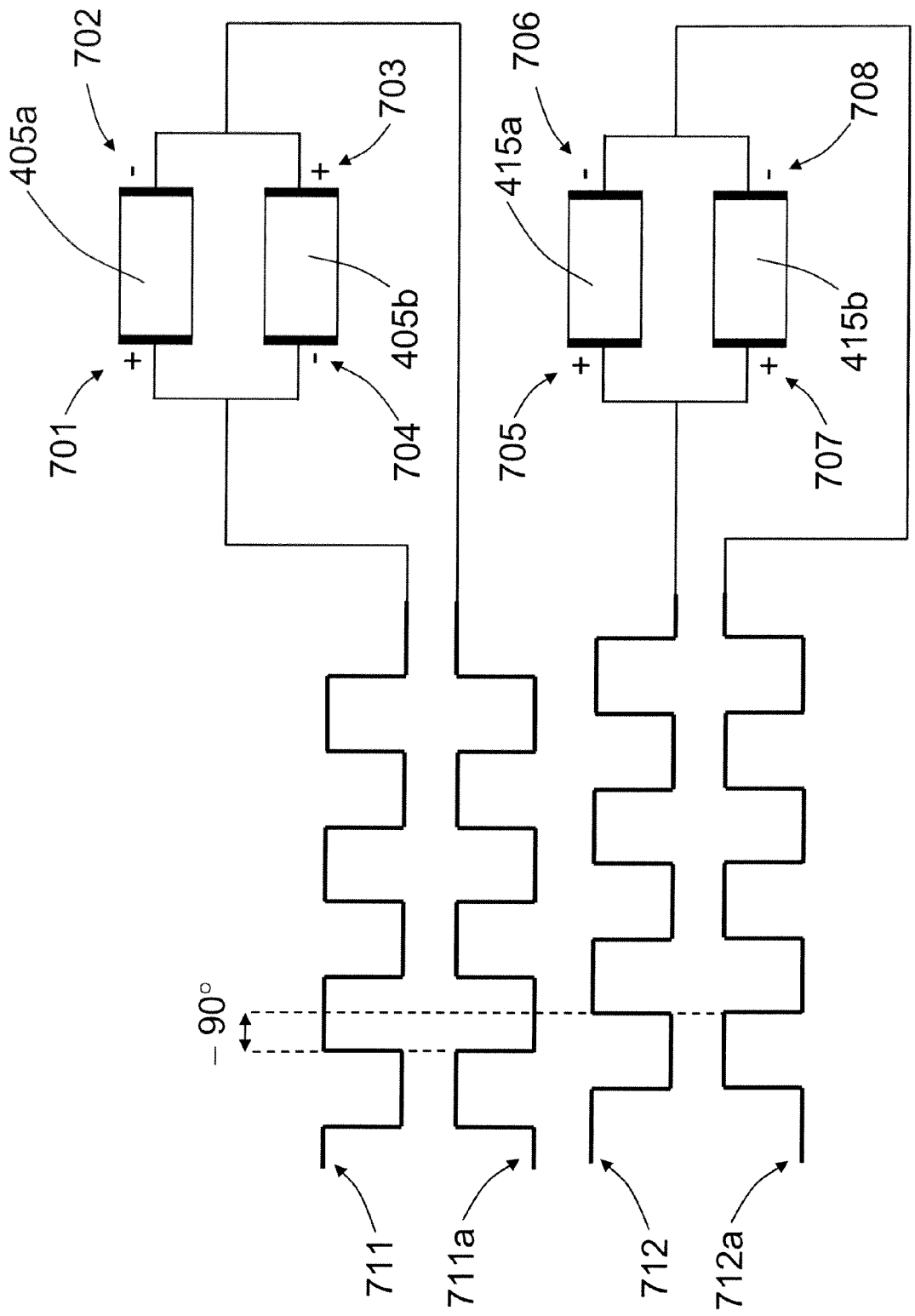
FIG. 7E is a partial graph and partial block diagram which illustrates exemplary electrical drive signals (full-bridge drive) for forward operation of an ultrasonically vibrating motor.
Figure 7F:
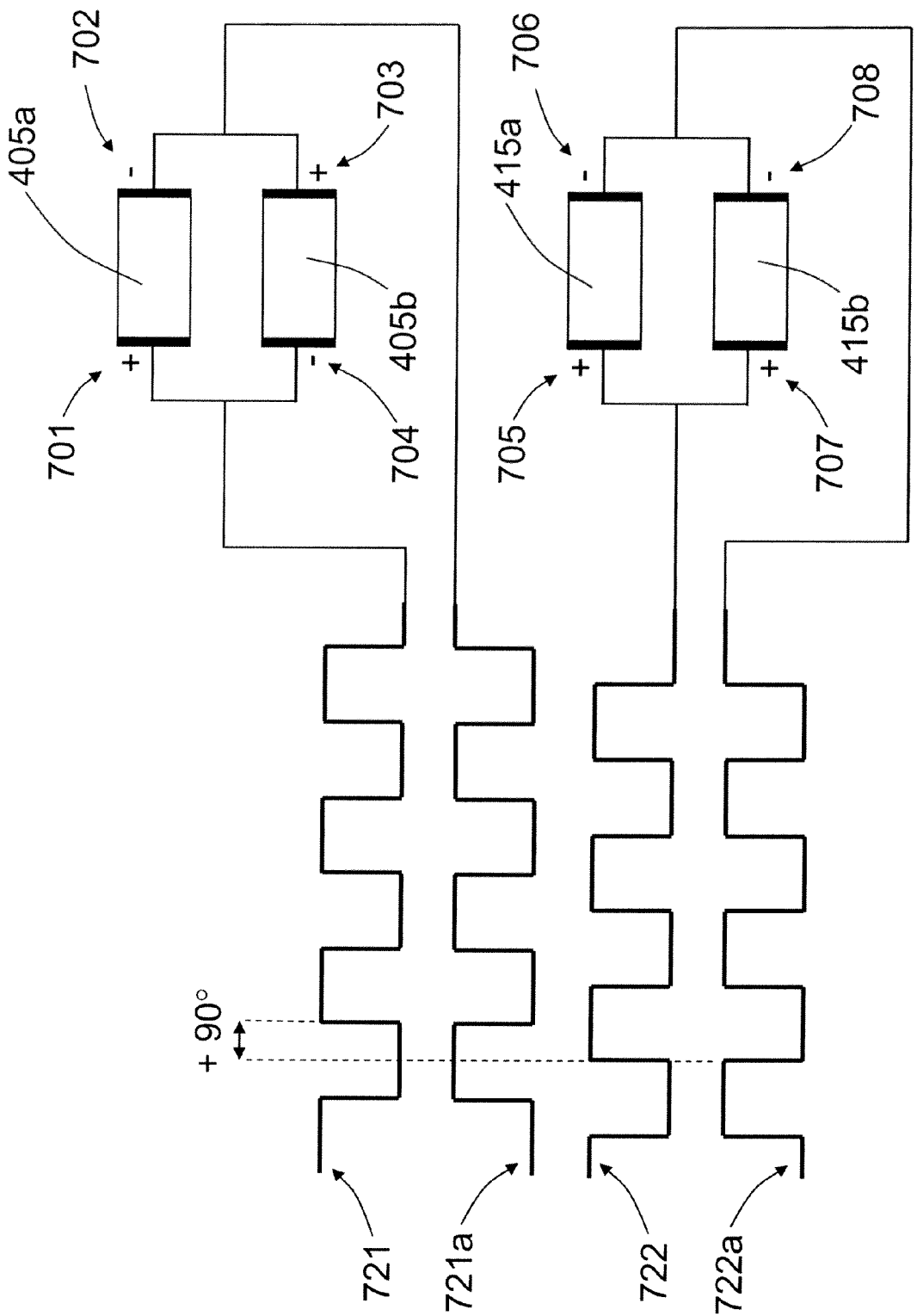
FIG. 7F is a partial graph and partial block diagram which illustrates exemplary electrical drive signals (full-bridge drive) for reverse operation of an ultrasonically vibrating motor.

The previously described electrical driving signals are half bridge drive methods. In some embodiments, full bridge drive methods (FIGS. 7E-7F), which use only about half the source voltage of that of the half bridge drive methods, may be similarly implemented to achieve the same (or a similar) effect. Specifically, comparing FIG. 7E with FIG. 7A for motor forward operation, or comparing FIG. 7F with FIG. 7C for motor reverse operation, a full bridge drive may be implemented when the negative electrode 702 of clamping actuator 405a and the positive electrode 703 of clamping actuator 405b are (instead of connected to ground) driven by a signal 711a which is a inverted signal of 711; and the negative electrodes 706 and 708 of the axial actuators 415a and 415b are (instead of connected to ground) driven by a signal 712a which is a inverted signal of 712.

EXAMPLE I

Maximizing Haptic Bouncing Frequency [Large Drive Force]

One application of the haptic actuator apparatus 10 in FIG. 1 includes providing a flat haptic acceleration response to a base device (e.g., a cell-phone that the vibration actuator is mounted on) over a relatively wide haptic frequency range (e.g., 100 Hz to 300 Hz). A flat base device haptic acceleration response may be equivalent to a flat motor acceleration with only a constant factor difference, e.g., the mass ratio between the ultrasonically vibrating motor or moving mass 50 and the base device. Thus, in the following, haptic displacement, velocity, and acceleration of the ultrasonically vibrating motor 50 are studied. In order to have a flat maximum haptic acceleration response, the velocity to hit the springs may be constant. This may be achieved when voltages applied to the actuators are fixed. Therefore, for a fixed maximum velocity $v_{max}$, and a targeted constant maximum acceleration of the ultrasonically vibrating motor 50, the spring constant of the stopper springs 220a-220d may be determined. The ultrasonically vibrating motor mass may be assumed constant, and the ultrasonically vibrating motor 50 may still be driven to continue compressing the stopper springs after hitting them. The maximum haptic acceleration may occur when the ultrasonically vibrating motor 50 compresses the springs to the maximum deflection and the velocity is zero. To target a certain haptic frequency or period of this bouncing motor 50, the gap between the stopper springs 220a-220d may also be determined, assuming the ultrasonically vibrating motor 50 runs at the full maximum speed $v_{max}$ in between the stopper springs 220a-220d.

Figure 8A:
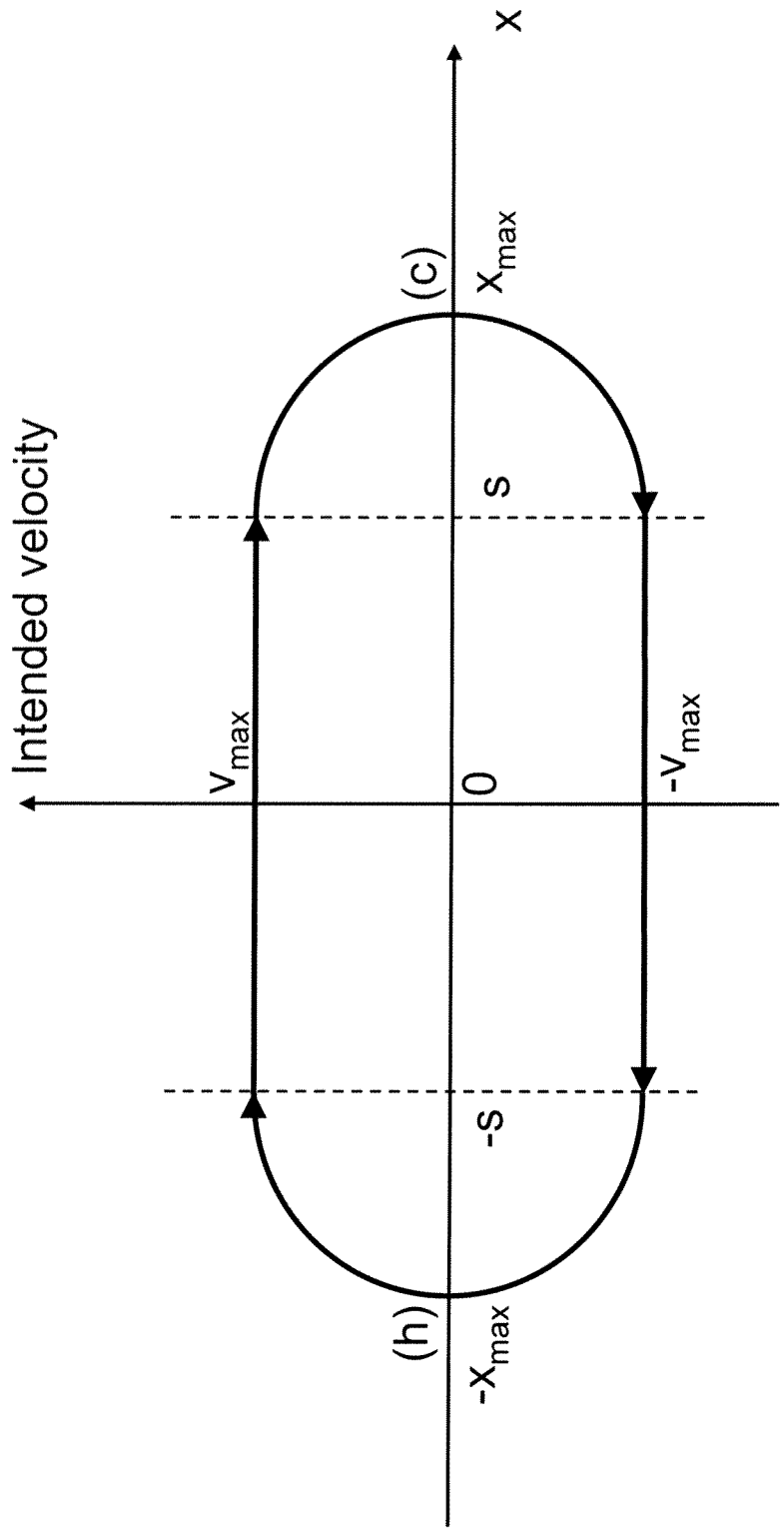
FIG. 8A is a diagram illustrating an exemplary intended haptic velocity profile as a function of position for maximizing bouncing frequency.
Figure 8B:
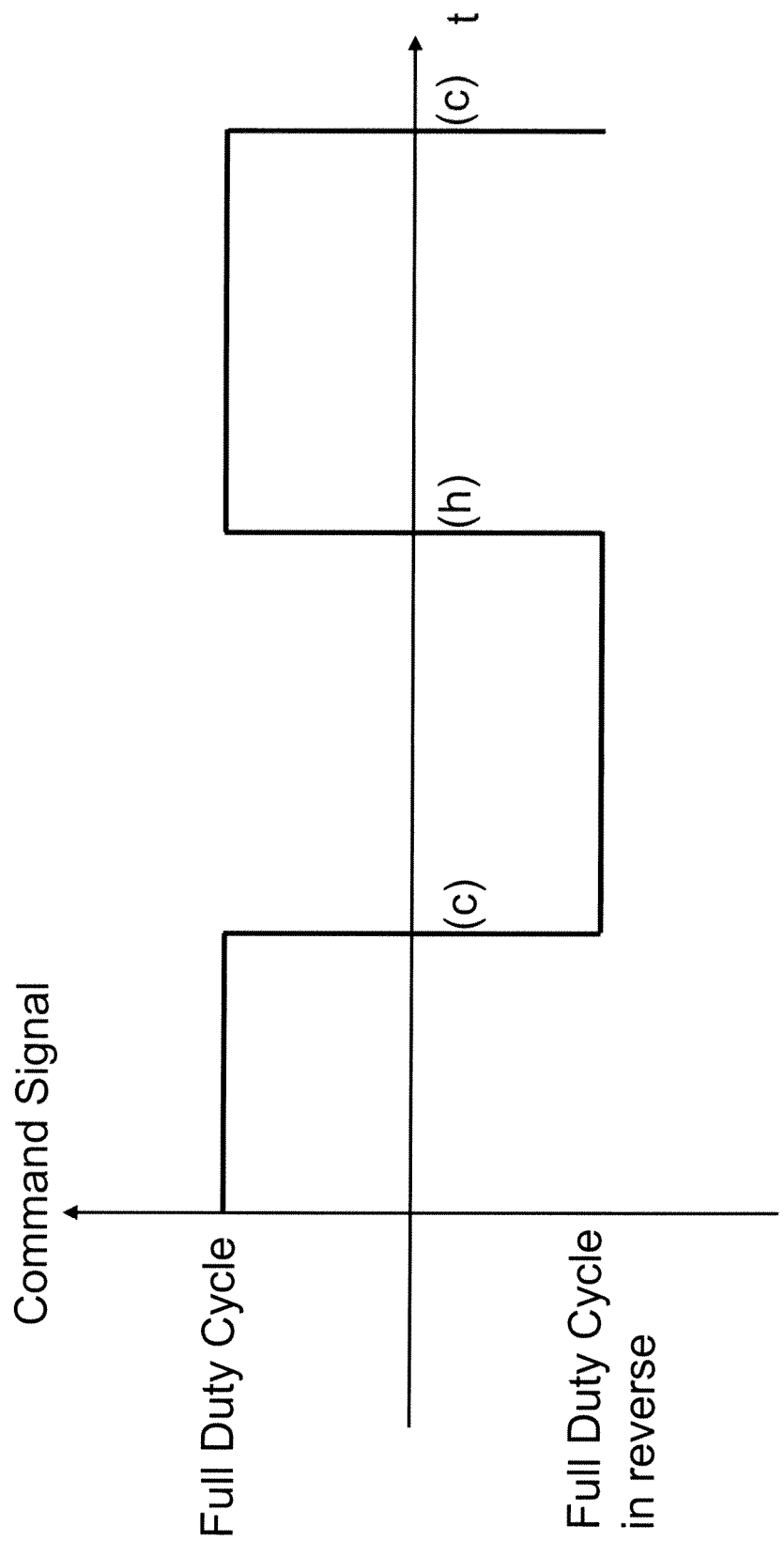
FIG. 8B is a graph of an exemplary command signal as a function of time for maximizing bouncing haptic accelerations and frequencies.

FIG. 8A depicts the intended haptic velocity profile as a function of position. The ultrasonically vibrating motor 50 may be intended to run at maximum speed $v_{max}$ (both forward and reverse) in between hitting the springs at ±s. The turning points may be at $±x_{max}$ which are also labeled as (h) and (c) on FIGS. 8A and 8B. FIG. 8B depicts the ultrasonically vibrating motor command signal as a function of time. The bouncing haptic frequency may be the maximum frequency that can be obtained from the system, which is the scenario in this Example I. Variable bouncing frequency operation will be discussed in Example II.

In FIG. 8B, the drive signal is shown as "full duty cycle," which corresponds to the maximum commanded velocity. In some embodiments, for a more cost-effective electrical driver, the ultrasonically vibrating motor 50 may be driven or switched between two voltage levels (e.g., ON or OFF) at the actuators' ultrasonic resonant frequency. In order to vary speed, because of the fixed driving voltages and simple ON or OFF switching, another option may be to change the duty cycle of the motor drive signals. Duty cycle is the proportion of time ON versus time OFF of the driving signal where a 50% proportion corresponds to "full duty cycle" and 0% proportion corresponds to zero signal. In this example, the command signal of the processor 70 is converted to a duty cycle value in the PWM generator 80 that is switched by the driver 30. When the duty cycle is maximized as in the case in FIG. 8B, the ultrasonically vibrating motor 50 may run at the fastest stable speed $v_{max}$ (at no load condition). When the duty cycle is 0%, the speed may be 0. When the duty cycle is in between 0% and 50%, the ultrasonically vibrating motor 50 may run at a reduced stable motor speed. The exact relationship between duty cycle and motor stable speed may not be linear and may need to be calibrated.

FIGS. 9A, 9B, and 9C depict the haptic displacement, velocity, acceleration of the ultrasonically vibrating motor 50 as a function of time in a simulated Example I. In particular, FIGS. 9A-9C assume that the ultrasonically vibrating motor 50 in Example I has a maximum speed of $v_{max}$=0.75 m/s. Example I assumes that motor 50 can reach its maximum speed (starting from zero speed) using one quarter of a period corresponding to the maximum bouncing haptic frequency. In particular, FIGS. 9A-9C assume that the motor 50 has a maximum bouncing haptic frequency of 300 Hz. The motor mass is 0.0012 kg. The estimated corresponding force F required is:

$F$=Mass×Acceleration=0.0012 kg×[0.75 m/s]/[1/(300 Hz)/4]=1.08 N.

This estimated force calculation may be slightly affected by the stiffness of stopper springs 220a-220d as well as by the distance between stopper spring pairs 220a-220b and 220c-220d. While the bouncing time at both ends of the path is small, it is not negligible; hence there will be a slight variation in the requisite force that may be factored into the estimation. Therefore, for example, in the simulation corresponding to FIGS. 9A-9C, a force of 1.25 N was used.

Figure 10A:
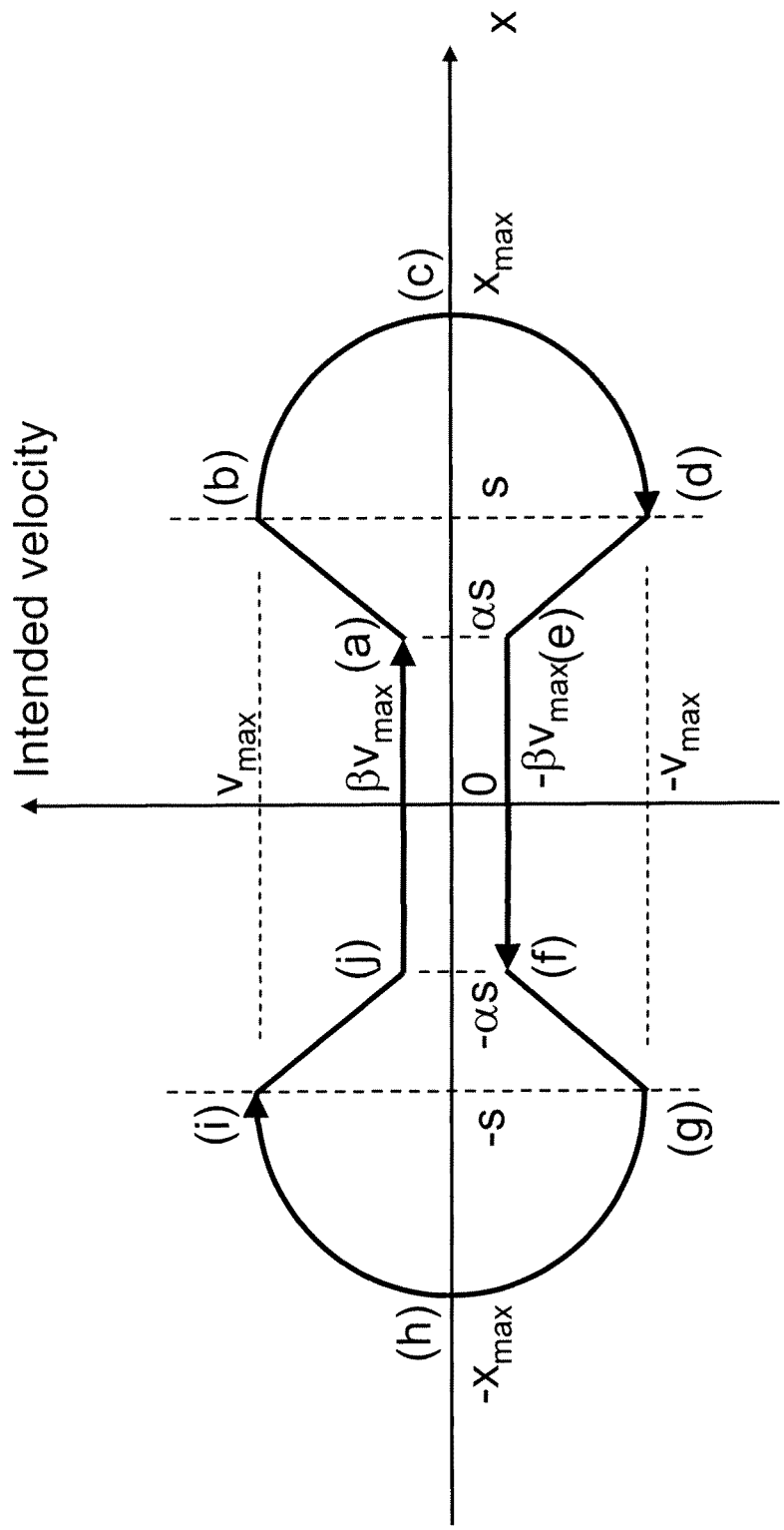
FIG. 10A is a diagram illustrating an exemplary intended haptic velocity profile as a function of position for variable bouncing frequency.
Figure 10B:
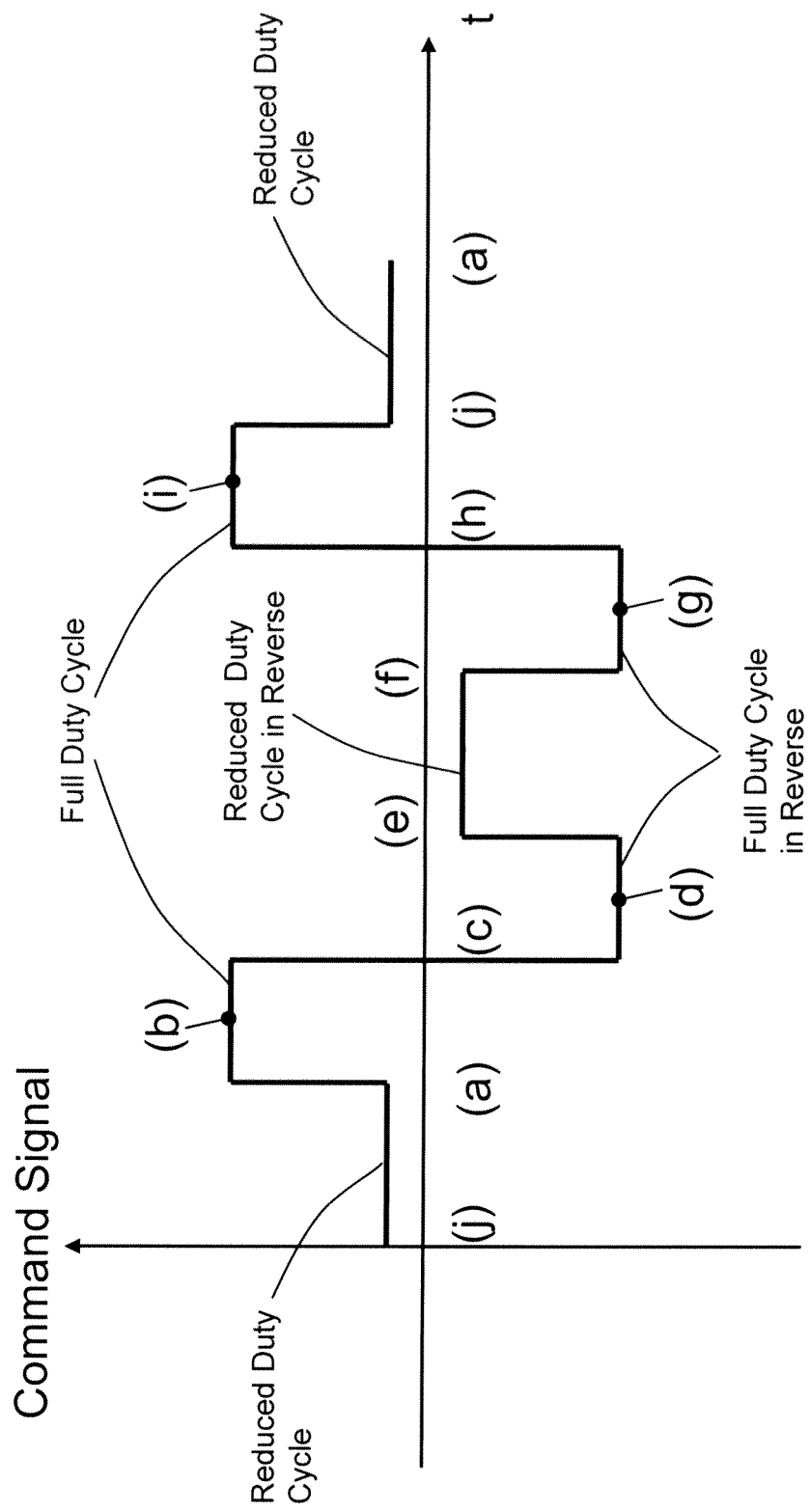
FIG. 10B is a graph of an exemplary command signal as a function of time, generating haptic accelerations and frequencies, for variable bouncing frequency.
Figure 11A:
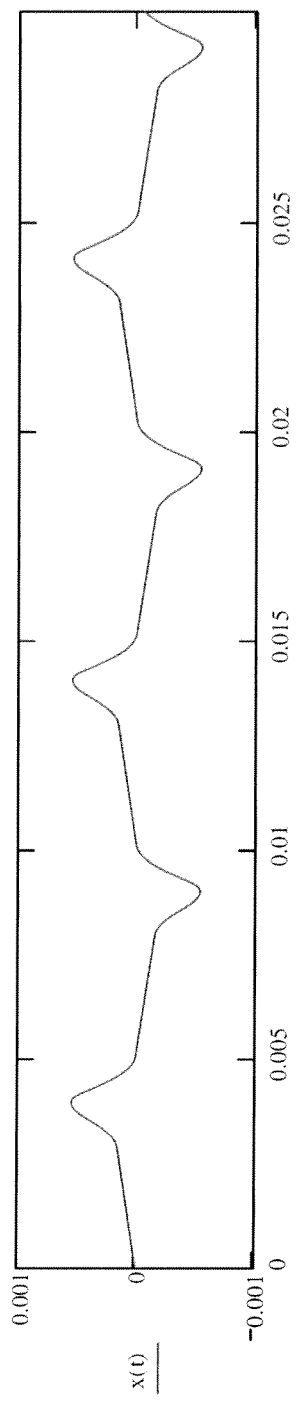
FIG. 11A is a graph of haptic displacement as a function of time for an exemplary ultrasonically vibrating motor with an intended haptic velocity profile as shown in FIG. 10A and a command signal as shown in FIG. 10B.
Figure 11B:
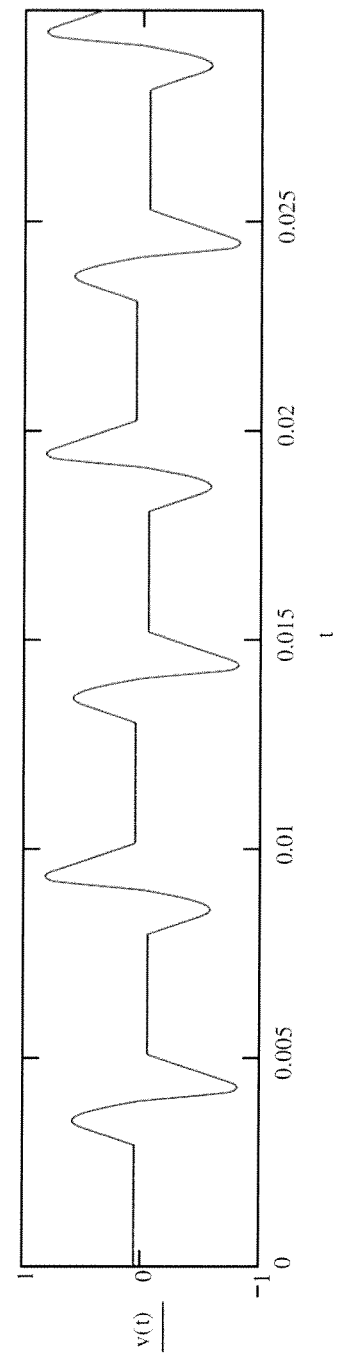
FIG. 11B is a graph of haptic velocity as a function of time for the ultrasonically vibrating motor associated with FIG. 11A.
Figure 11C:
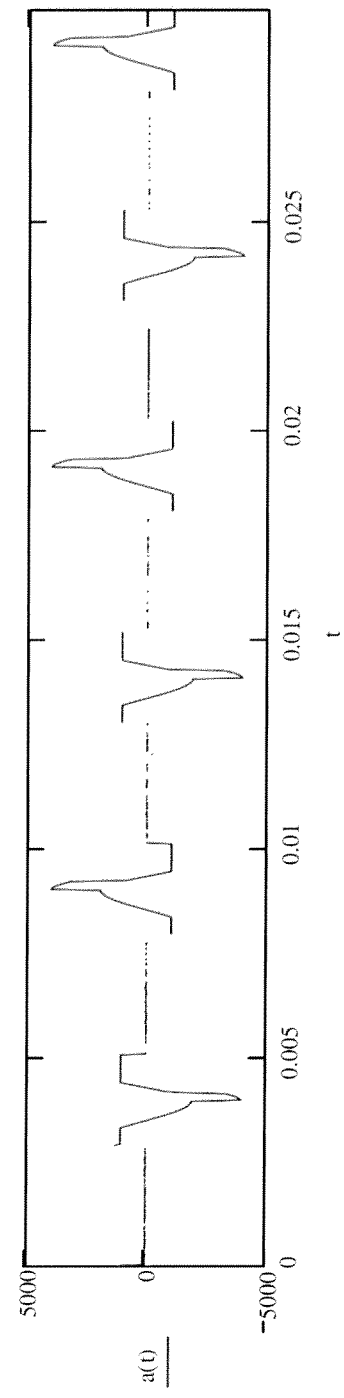
FIG. 11C is a graph of haptic acceleration as a function of time for the ultrasonically vibrating motor associated with FIG. 11A.

As will be discussed in Example II, assuming the same motor parameters but applying the intended haptic velocity profile of FIG. 10A and velocity command signal of FIG. 10B, the ultrasonically vibrating motor 50 may lower the bouncing haptic frequency to 200 Hz, as shown in FIGS. 11A-11C.

Example III, on the other hand, will demonstrate a scenario where the drive force of motor 50 is not large enough to reach its maximum speed using one quarter of a period corresponding to the maximum bouncing haptic frequency.

EXAMPLE II

Variable Bouncing Haptic Frequency

One effective way to obtain a lower bouncing haptic frequency (longer period) of the ultrasonically vibrating motor 50, while still maintaining the maximum acceleration of the ultrasonically vibrating motor 50 (at the turning of the motor 50 when compressing the stopper springs to the maximum deflection), may be to reduce the commanded velocity for the first half of the travel bouncing in between the two springs. The intended motor velocity profile is depicted in FIG. 10A, and the corresponding velocity command signal as a function of time is shown in FIG. 10B. With reference to both FIGS. 10A and 10B, the ultrasonically vibrating motor 50 may first be driven with a reduced duty cycle to move at a reduced speed of $\beta v_{max}$ (section (j)-(a)) towards the forward stopper spring. It may be projected at position $\alpha s$ or point (a) that the speed needs to increase; thus, the speed may subsequently be increased to $v_{max}$, hitting the forward spring at position s or point (b). Correspondingly, the command signal for section (a)-(b) is full duty cycle. The command signal may maintain the full duty cycle, until the forward spring is fully compressed, and the ultrasonically vibrating motor 50 may begin to reverse direction at position $x_{max}$ or point (c). When the ultrasonically vibrating motor 50 reverses direction (v=0), the command signal may also invert the motor drive signal phase (direction) to full duty cycle in reverse. The motor speed may gradually reach $-v_{max}$ at about leaving the forward spring at position s or point (d). At point (d), the motor speed may need to slow down, and the ultrasonically vibrating motor 50 may be commanded with a reduced duty cycle to move at a reduced speed of $-\beta v_{max}$. At position as or point (e), the motor speed may have already slowed down to $-\beta v_{max}$, and the ultrasonically vibrating motor 50 may still be driven with the reduced duty cycle to maintain this speed to position $-\alpha s$ or point (f), where it may be projected to increase speed (in magnitude) here. At point (f), the motor drive signal may switch to full duty cycle in reverse. The motor speed may gradually reach $-v_{max}$, hitting the reverse spring at position $-s$ or point (g). The drive signal may maintain at the full duty cycle in reverse, until the reverse spring is fully compressed and the ultrasonically vibrating motor 50 begins to reverse direction at position $-x_{max}$ or point (h). When the ultrasonically vibrating motor 50 reverses direction (v=0) to forward, the drive signal may also reverse to full duty cycle forward. The motor speed may gradually reach $v_{max}$ at about leaving the reverse spring at position $-s$ or point (i). At point (i), the motor speed may need to slow down, and the ultrasonically vibrating motor 50 may be commanded with a reduced duty cycle to move at a reduced speed of $\beta v_{max}$. At position $-\alpha s$ or point (j), the speed may be reduced to $\beta v_{max}$ and the ultrasonically vibrating motor 50 may still be commanded with the reduced duty cycle forward to maintain this speed to point (a). Then the full cycle may begin and repeat itself.

The targeted bouncing haptic frequency (which is lower than the maximum bouncing haptic frequency in Example I) may determine the parameters α and β. It should be noted that Example I is a special instance of Example II, where α approaches 1 and β approaches 1. The lowest bouncing frequency may be limited by how low the velocity ($\beta v_{max}$) may be reduced at the mid-way section (j)-(a) or section (e)-(f), which may be strongly determined by the drive force. The reason for this is because how fast the speed can be changed during the sections (a)-(b), (d)-(e), (f)-(g), and (i)-(j) strongly depends on the drive force. When the drive force is large enough, the velocity at the mid-way may reach zero, and, therefore, a zero haptic frequency of the bouncing may be obtained. FIGS. 11A-11C show the haptic displacement, velocity, and acceleration of the ultrasonically vibrating motor 50 as a function of time for a similar system as in FIGS. 9A-9C, except with a velocity profile as shown in FIG. 10A and the velocity command signal as shown in FIG. 10B. Note that the same maximum haptic acceleration as shown in FIG. 9C may almost be maintained.

EXAMPLE III

Maximizing Bouncing Haptic Frequency [Small Drive Force]

When the drive force is small, the rate of velocity change (acceleration) is limited, and the lower limit for the bouncing haptic frequency is limited. When the drive force is low, a more effective way to reduce the bouncing haptic frequency may be to increase the gap between the two stopper springs, while maintaining the same maximum driving velocity in between the bouncing.

Figure 12A:
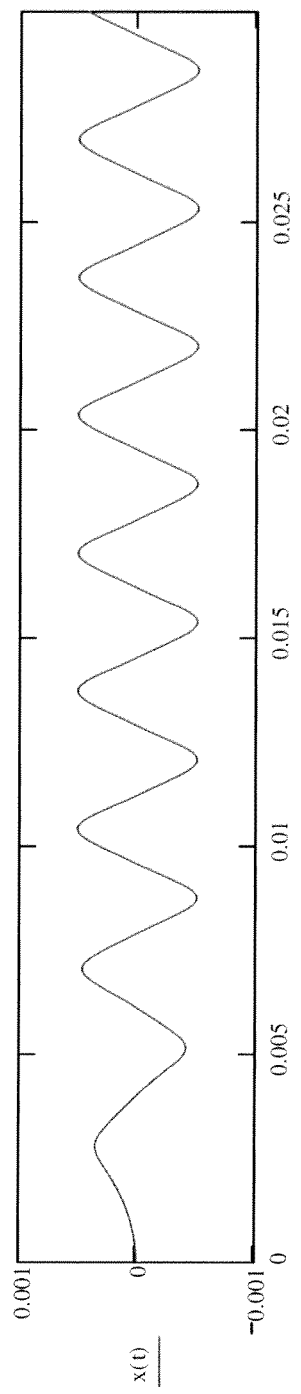
FIG. 12A is a graph of haptic displacement as a function of time for the ultrasonically vibrating motor associated with FIG. 9A, except with a ten times smaller drive force between the contact pads and rails.
Figure 12B:
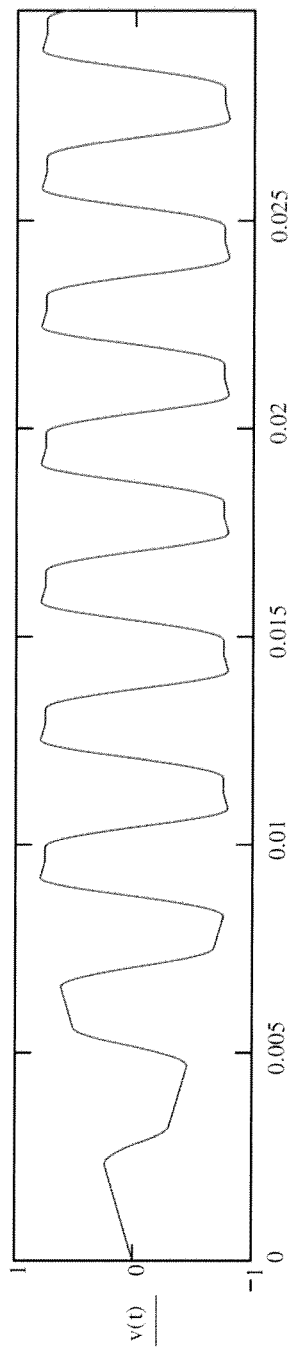
FIG. 12B is a graph of haptic velocity as a function of time for the ultrasonically vibrating motor associated with FIG. 12A.
Figure 12C:
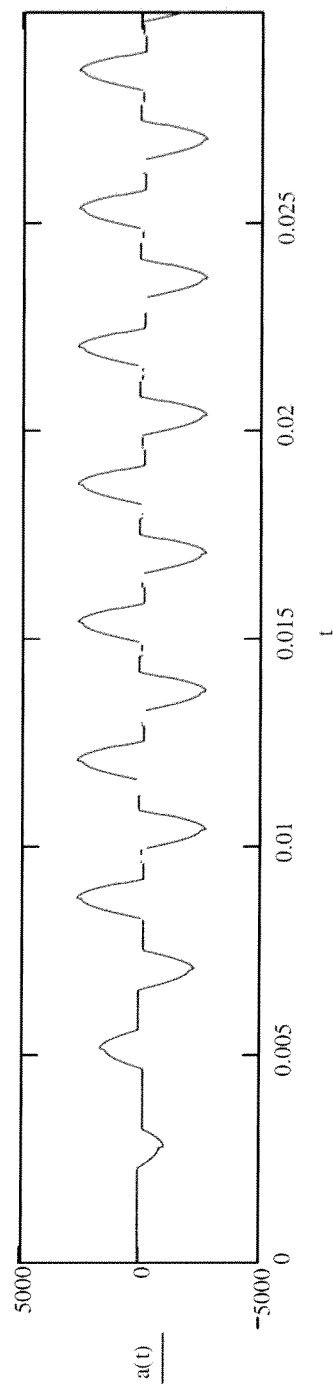
FIG. 12C is a graph of haptic acceleration as a function of time for the ultrasonically vibrating motor associated with FIG. 12A.

When changing the gap between the two stopper springs is not available, the ultrasonically vibrating motor 50 essentially operates as in Example I, i.e., at a fixed haptic frequency (i.e., variable haptic frequency operation as proposed in Example II is not available, due to the small drive force). Because the driving force is small, during the start up, there are a few bounces that may be necessary to bring the speed in between the bouncing to the maximum allowed. FIGS. 12A-12C depicts the haptic displacement, velocity, and acceleration of the ultrasonically vibrating motor 50 as a function of time for a similar system as in FIGS. 9A-9C, except with a 10 times smaller drive force of 0.125 N. After a brief startup, the maximum velocity and maximum haptic acceleration may still be achieved (or almost achieved) with the help of accumulation of energy during the first several cycles of the bouncing.

In these embodiments, stopper springs 220a-220d may enable a very small package (also smaller driver force) to obtain the maximum speed and maximum acceleration; the stopper springs 220a-220d may provide forces and corresponding haptic accelerations (at the maximum deflection) more than twenty-five times the drive force of the ultrasonically vibrating motor 50. Even for a large drive force system, the stopper springs 220a-220d may still be useful in reducing the size, although perhaps not as effective as in lower drive force systems. In some embodiments, the stopper springs 220a-220d may not be very lossy. In some embodiments, the stopper springs 220a-220d may be elastic springs.

Figure 13A:
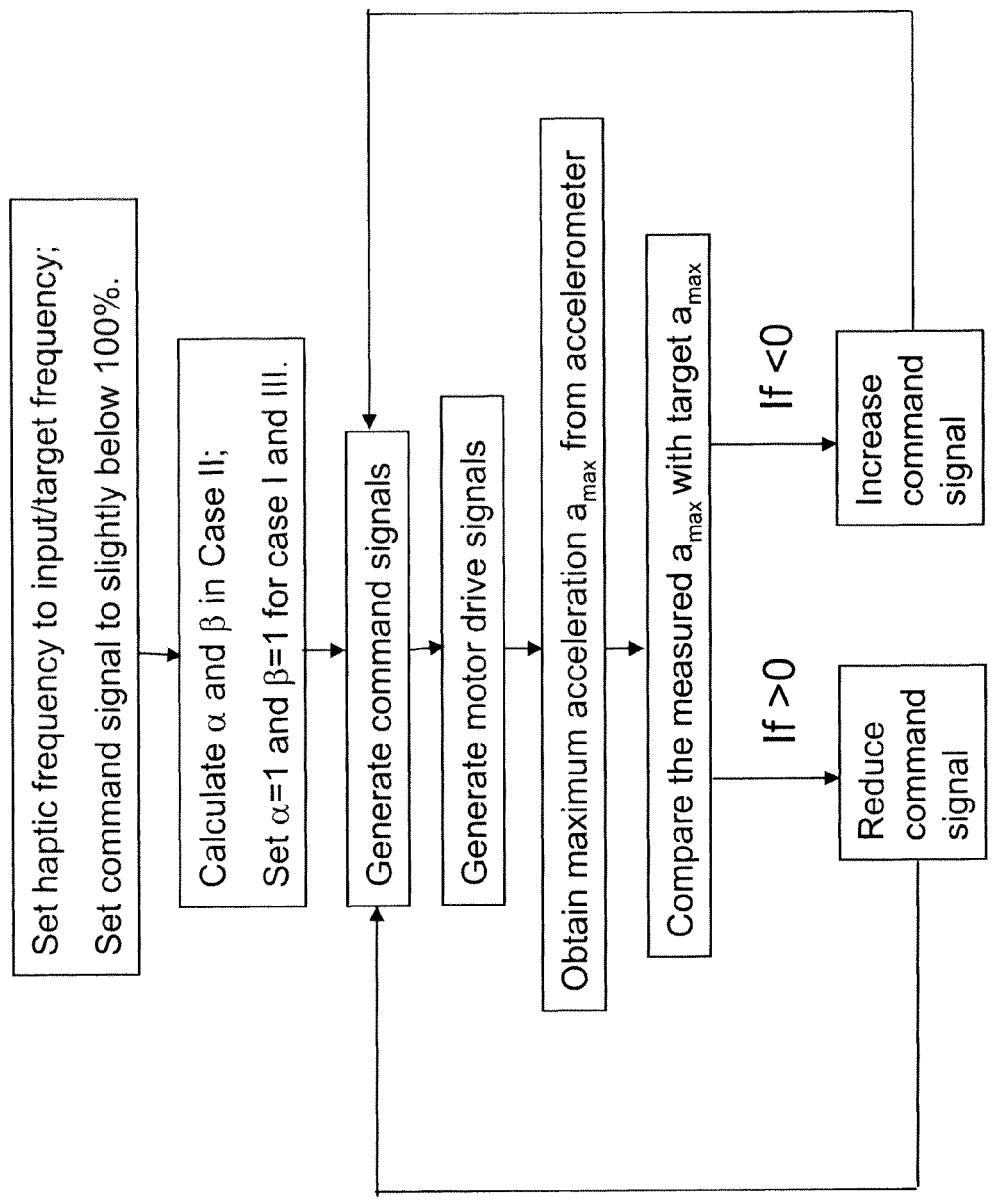
FIG. 13A is an exemplary method for driving the haptic actuator apparatus shown in FIG. 1, where an accelerometer is used.

FIG. 13A is an exemplary method for driving the haptic actuator apparatus 10 in FIG. 1, where an accelerometer is used. Referring to FIG. 13A, in order to achieve a certain haptic feeling (e.g., certain frequency and a certain maximum acceleration), the frequency for the command signal may be set to the input or target haptic frequency. The parameters α and β may be predetermined based upon the frequency input and the nominal system values for the spring constant, moving mass, and the maximum velocity at the drive voltage level. (For a fixed-frequency operation, α and β may both be set to 1, which yields the scenario described in either Example I or Example III.) Here, the maximum velocity is actually a maximum velocity that corresponds to a maximum command signal that corresponds to a certain predefined motor drive duty cycle that is slightly less than 100% duty cycle. It may be assumed that there may be some slight variation (for example, manufacturing variations) in these system parameters that may cause the maximum acceleration to be unequal to the targeted one. Under that assumption, the $v_{max}$ may be adjusted by changing the command signal which adjusts the motor drive duty cycle above or below the pre-defined duty cycle, depending upon whether the $a_{max}$ measured from the accelerometer is below or above the targeted $a_{max}$, respectively. This closed-loop algorithm may self-adjust the haptic $a_{max}$ to the targeted haptic $a_{max}$ very quickly.

Figure 13B:
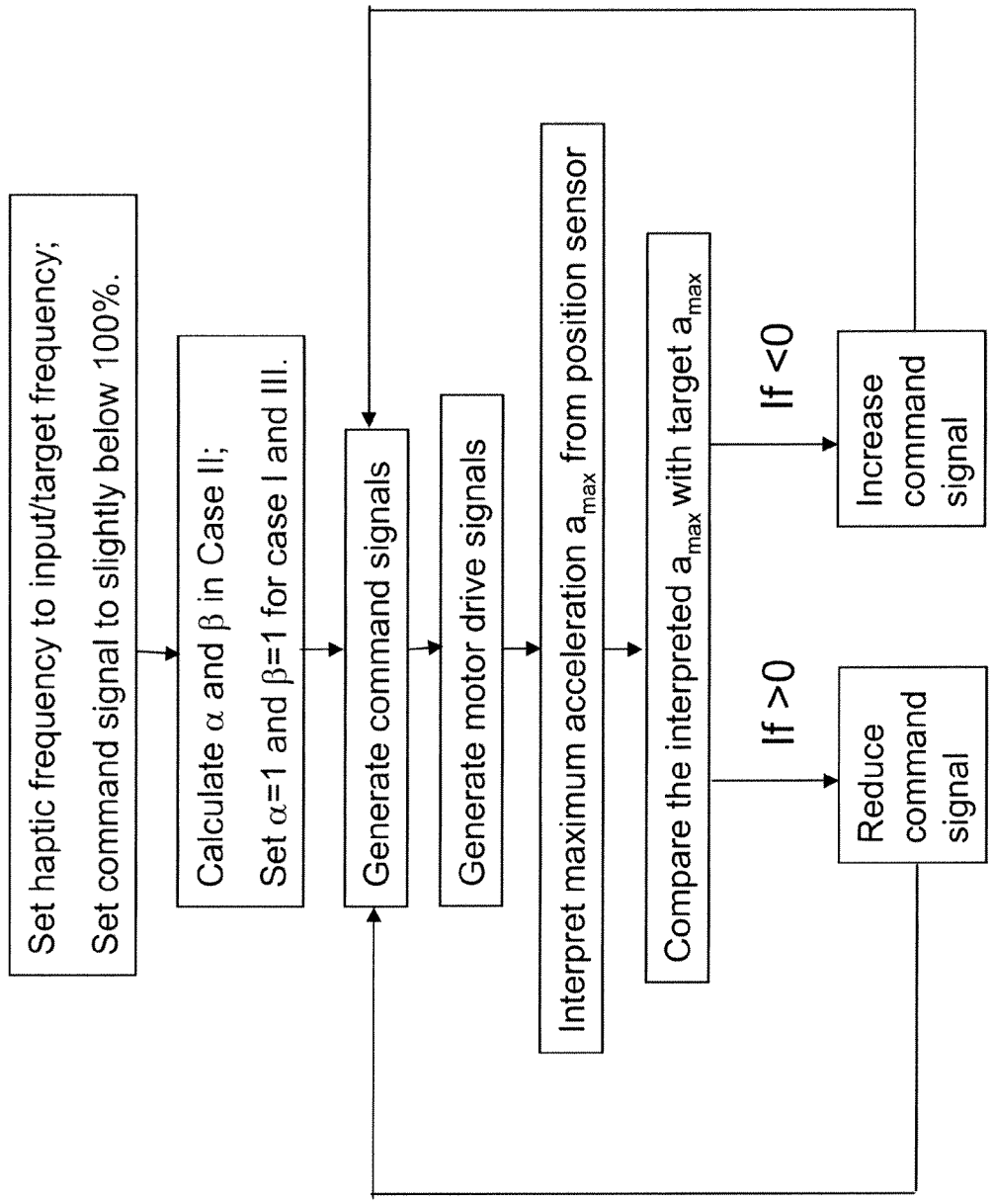
FIG. 13B is an exemplary method for driving the haptic actuator apparatus shown in FIG. 1, where a positional encoder is used.

If a position encoder is used instead of the accelerometer, a similar driving method as that in FIG. 13A may be used, except that the targeted haptic $a_{max}$ may not be measured directly. Rather, it may be interpreted by the position encoder and the time spent in the turning at $-x_{max}$ (from most negative position to $-s$) and $x_{max}$ (from most positive position to s). This driving method is shown in the flow diagram in FIG. 13B. An interpreted acceleration may be noisy and may not be as accurate as one directly measured; thus using an accelerometer may be a preferred sensing method if an accurate acceleration is required.

Without sensors, the system may approximately generate haptic accelerations and frequencies based on the nominal values of the system parameters. Thus, the maximum haptic accelerations and frequencies may have a range of values due to manufacturing tolerances.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. For example, based upon various design and electro-mechanical parameters, rails 205-206, stopper springs 220a-220d, sensor 40, and ultrasonically vibrating motor 50 may be located at other positions in various embodiments of the haptic actuators described above. Two or more components of the above-described haptic actuator apparatuses may be integrated or be made parts of an integrated circuit chip. Further, alterations in electrical and mechanical components may be realized by interchanging and/or adding electrical connections and components for mechanical connections or components and vice-versa, as and when appropriate without departing from the scope of the various exemplary aspects of the technology as described above. Additionally, the recited order of processing elements or sequences, or the use of numbers, letters, or other designations therefore, is not intended to limit the claimed processes to any order except as may be specified in the claims. Accordingly, the invention may be limited only by the following claims and equivalents thereto.

What is claimed is:

1. A haptic actuator apparatus comprising:
   an ultrasonically vibrating motor; and
   a housing of the ultrasonically vibrating motor, the housing comprising:
      a guide structure coupled to the ultrasonically vibrating motor, the guide structure configured to define at least one path of motion of the ultrasonically vibrating motor; and
      at least one spring coupled to the guide structure and arranged to delimit the at least one path of motion of the ultrasonically vibrating motor and to generate human-detectible vibrations in response to an impact with the ultrasonically vibrating motor.

2. The haptic actuator apparatus as set forth in claim 1, wherein the guide structure comprises an upper rail and a bottom rail, and wherein the at least one path of motion of the ultrasonically vibrating motor is substantially parallel to the upper rail and the bottom rail.

3. The haptic actuator apparatus as set forth in claim 1, wherein the at least one spring is further arranged to slow, stop, or reverse a motion of the ultrasonically vibrating motor.

4. The haptic actuator apparatus as set forth in claim 1, wherein the ultrasonically vibrating motor comprises at least one piezoelectric element.

5. The haptic actuator apparatus as set forth in claim 4, wherein the at least one piezoelectric element generates ultrasonic vibrations in planes parallel and orthogonal to the at least one path of motion, and wherein the ultrasonic vibrations are substantially ninety degrees out of phase.

6. The haptic actuator apparatus as set forth in claim 1, wherein the housing further comprises a sensor configured to measure a location, velocity, or acceleration of the ultrasonically vibrating motor.

7. The haptic actuator apparatus as set forth in claim 1, wherein the housing further comprises a driver configured to provide one or more signals for energizing the ultrasonically vibrating motor to generate ultrasonic vibrations accelerating the ultrasonically vibrating motor along the at least one path of motion.

8. The haptic actuator apparatus as set forth in claim 7, wherein the driver comprises one or more half bridge drive circuits and digital control logic.

9. The haptic actuator apparatus as set forth in claim 7, wherein the driver comprises one or more full bridge drive circuits and digital control logic.

10. The haptic actuator apparatus as set forth in claim 7, wherein the driver is further configured to change a phase and an amplitude of the ultrasonic vibrations, thereby reversing a direction of the ultrasonically vibrating motor and changing a magnitude of a force generated by the ultrasonically vibrating motor.

11. The haptic actuator apparatus as set forth in claim 10, wherein a timing of the change of the phase and the amplitude of the ultrasonic vibrations is based on at least one of a stiffness of the at least one spring, a mass of the ultrasonically vibrating motor, or the force generated by the ultrasonically vibrating motor.

12. The haptic actuator apparatus as set forth in claim 10, wherein a timing of the change of the phase and the amplitude of the ultrasonic vibrations is based on a measurement of a sensor coupled to either the ultrasonically vibrating motor or the housing, wherein the sensor is configured to measure a location, a velocity, or an acceleration of either the ultrasonically vibrating motor or the housing.

13. The haptic actuator apparatus as set forth in claim 12, wherein the human-detectible vibrations are generated at a predetermined frequency and acceleration based on the timing.

14. A method of making a haptic actuator apparatus, the method comprising:
   providing an ultrasonically vibrating motor;
   coupling a guide structure to the ultrasonically vibrating motor, the guide structure configured to define at least one path of motion of the ultrasonically vibrating motor; and
   coupling at least one spring to the guide structure, the at least one spring being arranged to delimit the at least one path of motion of the ultrasonically vibrating motor and to generate human-detectible vibrations in response to an impact with the ultrasonically vibrating motor.

15. The method as set forth in claim 14, wherein the guide structure comprises an upper rail and a bottom rail, and wherein the at least one path of motion of the ultrasonically vibrating motor is substantially parallel to the upper rail and the bottom rail.

16. The method as set forth in claim 14, wherein the at least one spring is further arranged to slow, stop, or reverse a motion of the ultrasonically vibrating motor.

17. The method as set forth in claim 14, wherein the ultrasonically vibrating motor comprises at least one piezoelectric element.

18. The method as set forth in claim 17, wherein the at least one piezoelectric element generates ultrasonic vibrations in planes parallel and orthgonal to the at least one path of motion, and wherein the ultrasonic vibrations are substantially ninety degrees out of phase.

19. The method as set forth in claim 14, the method further comprising:
providing a sensor configured to measure a location, velocity, or acceleration of the ultrasonically vibrating motor.

20. The method as set forth in claim 14, the method further comprising:
providing a driver configured to provide one or more signals for energizing the ultrasonically vibrating motor to generate ultrasonic vibrations accelerating the ultrasonically vibrating motor along the at least one path of motion.

21. The method as set forth in claim 20, wherein the driver comprises one or more half bridge drive circuits and digital control logic.

22. The method as set forth in claim 20, wherein the driver comprises one or more full bridge drive circuits and digital control logic.

23. The method as set forth in claim 20, wherein the driver is further configured to change a phase and an amplitude of the ultrasonic vibrations, thereby reversing a direction of the ultrasonically vibrating motor and changing a magnitude of a force generated by the ultrasonically vibrating motor.

24. The method as set forth in claim 23, wherein a timing of the change of the phase and the amplitude of the ultrasonic vibrations is based on at least one of a stiffness of the at least one spring, mass of the ultrasonically vibrating motor, or the force generated by the ultrasonically vibrating motor.

25. The method as set forth in claim 23, wherein a timing of the change of the phase and the amplitude of the ultrasonic vibrations is based on a measurement of a sensor coupled to either the ultrasonically vibrating motor or the housing, wherein the sensor is configured to measure a location, a velocity, or an acceleration of either the ultrasonically vibrating motor or the housing.

26. The method as set forth in claim 25, wherein the human-detectible vibrations are generated at a predetermined frequency and acceleration based on the timing.

* * * * *